(12) United States Patent
Hinde

(10) Patent No.: US 9,248,774 B2
(45) Date of Patent: Feb. 2, 2016

(54) SYSTEM FOR ADJUSTING OVER-AXLE WEIGHT OF A VACUUM TANK TRUCK

(71) Applicant: Douglas Hinde, King City (CA)

(72) Inventor: Douglas Hinde, King City (CA)

(73) Assignee: TRINITY GROUP LTD, Ontario (CA)

( * ) Notice: Subject to any disclaimer, the term of this patent is extended or adjusted under 35 U.S.C. 154(b) by 79 days.

(21) Appl. No.: 14/231,791

(22) Filed: Apr. 1, 2014

(65) Prior Publication Data

US 2015/0274057 A1   Oct. 1, 2015

(51) Int. Cl.
| | |
|---|---|
| *B60P 3/22* | (2006.01) |
| *F15B 15/16* | (2006.01) |
| *B62D 33/08* | (2006.01) |
| *B60P 1/16* | (2006.01) |
| *B60P 1/34* | (2006.01) |
| *B62B 3/04* | (2006.01) |

(52) U.S. Cl.
CPC ............... *B60P 3/2205* (2013.01); *B60P 1/162* (2013.01); *B60P 1/34* (2013.01); *B60P 3/2245* (2013.01); *B62B 3/04* (2013.01); *B62D 33/08* (2013.01); *F15B 15/16* (2013.01); *B60P 3/2255* (2013.01); *F15B 2211/7057* (2013.01)

(58) Field of Classification Search
CPC .... B60P 3/2205; B60P 3/2245; B60P 3/2255; B60P 1/34; B62B 3/04
See application file for complete search history.

(56) References Cited

U.S. PATENT DOCUMENTS

| | | | |
|---|---|---|---|
| 3,022,111 A | 2/1962 | Hutchinson | |
| 3,232,666 A | 2/1966 | Hutchinson | |
| 4,289,353 A | 9/1981 | Merritt | |
| 4,755,097 A | 7/1988 | Corompt | |
| 4,889,464 A | 12/1989 | Self | |
| 5,088,875 A | 2/1992 | Galbreath et al. | |
| 5,183,371 A | 2/1993 | O'Daniel | |
| 5,299,856 A | 4/1994 | Grosz | |
| 5,454,620 A * | 10/1995 | Hill et al. | 296/183.2 |
| 6,752,467 B1 | 6/2004 | Palrose et al. | |
| 8,328,290 B2 | 12/2012 | Malatesta et al. | |
| 2002/0000748 A1* | 1/2002 | Fuller et al. | 298/17 R |
| 2014/0130452 A1* | 5/2014 | Costello et al. | 53/408 |

* cited by examiner

*Primary Examiner* — Faye M Fleming
(74) *Attorney, Agent, or Firm* — Fraser Clemens Martin & Miller LLC; William J. Clemens

(57) ABSTRACT

A system for varying the weight over one or more axles of a truck carrying a container, the container, the truck and the one or more axles being arranged in the manner of a vacuum tank mounted on a vacuum truck having a front axle and one or more rear axles, the system including: a telescopic subframe comprising one or more elongate structures, each elongate structure having a fixed part and a telescoping part telescopically engaged with the fixed part, and each fixed part fixedly attached to a mounting frame of the truck so that the telescopic subframe lays substantially horizontally on the mounting frame; and one or more hydraulic cylinders operable by a controller, each hydraulic cylinder attached to and operably coupling the truck and the vacuum tank.

34 Claims, 16 Drawing Sheets

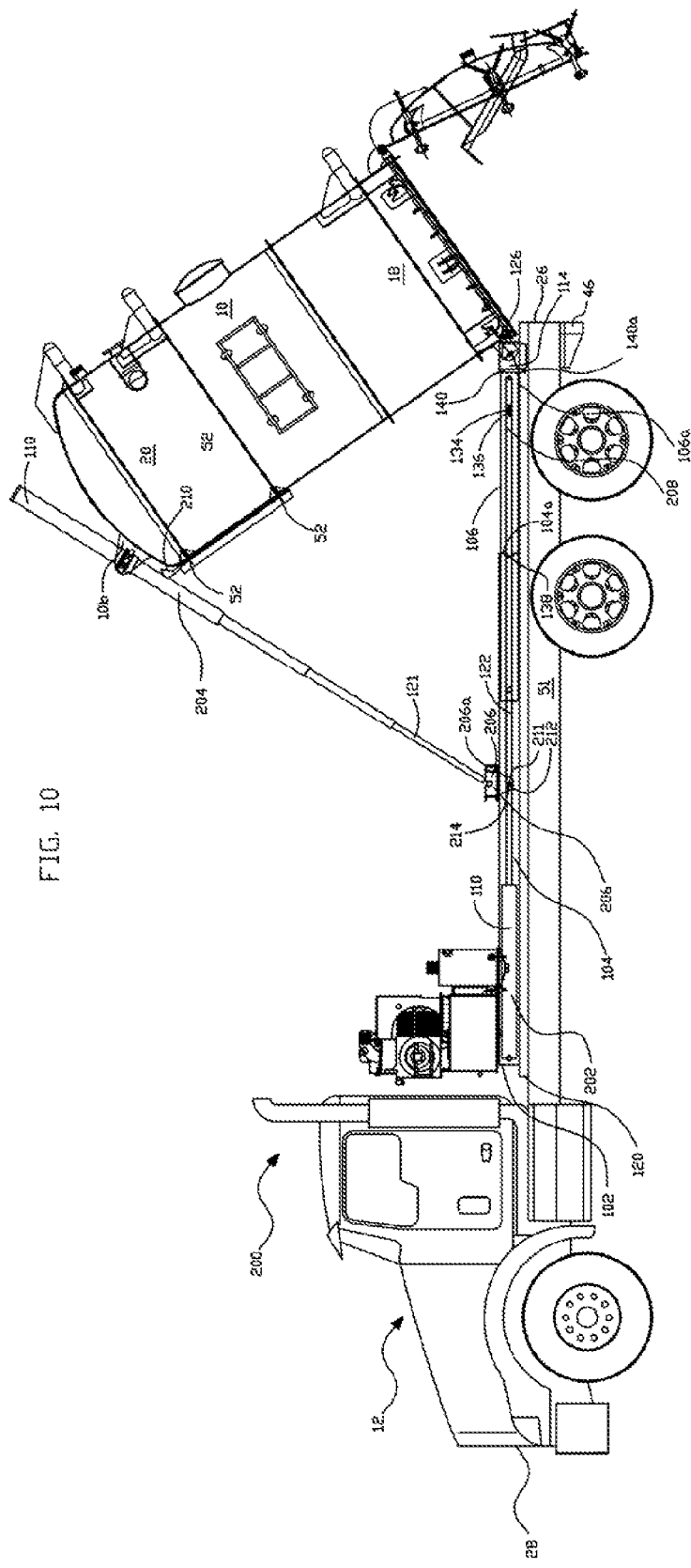

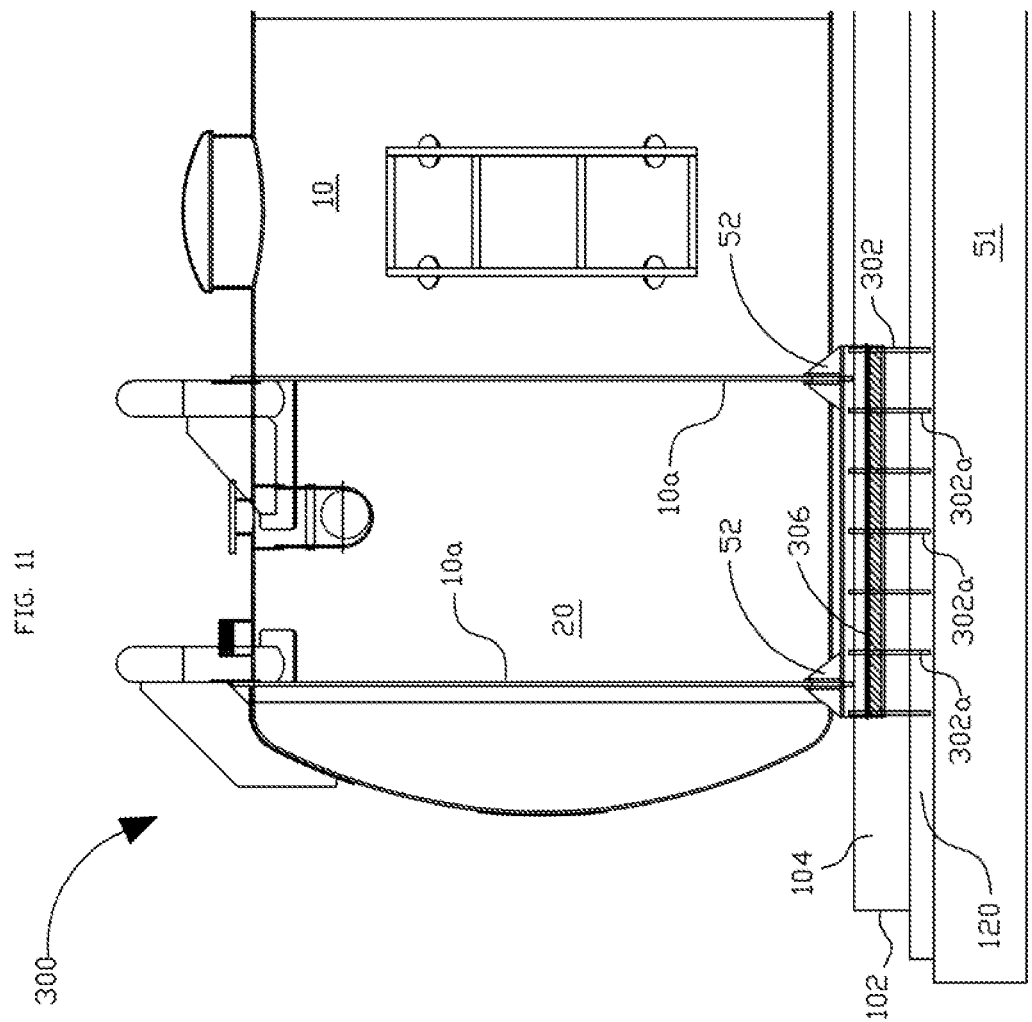

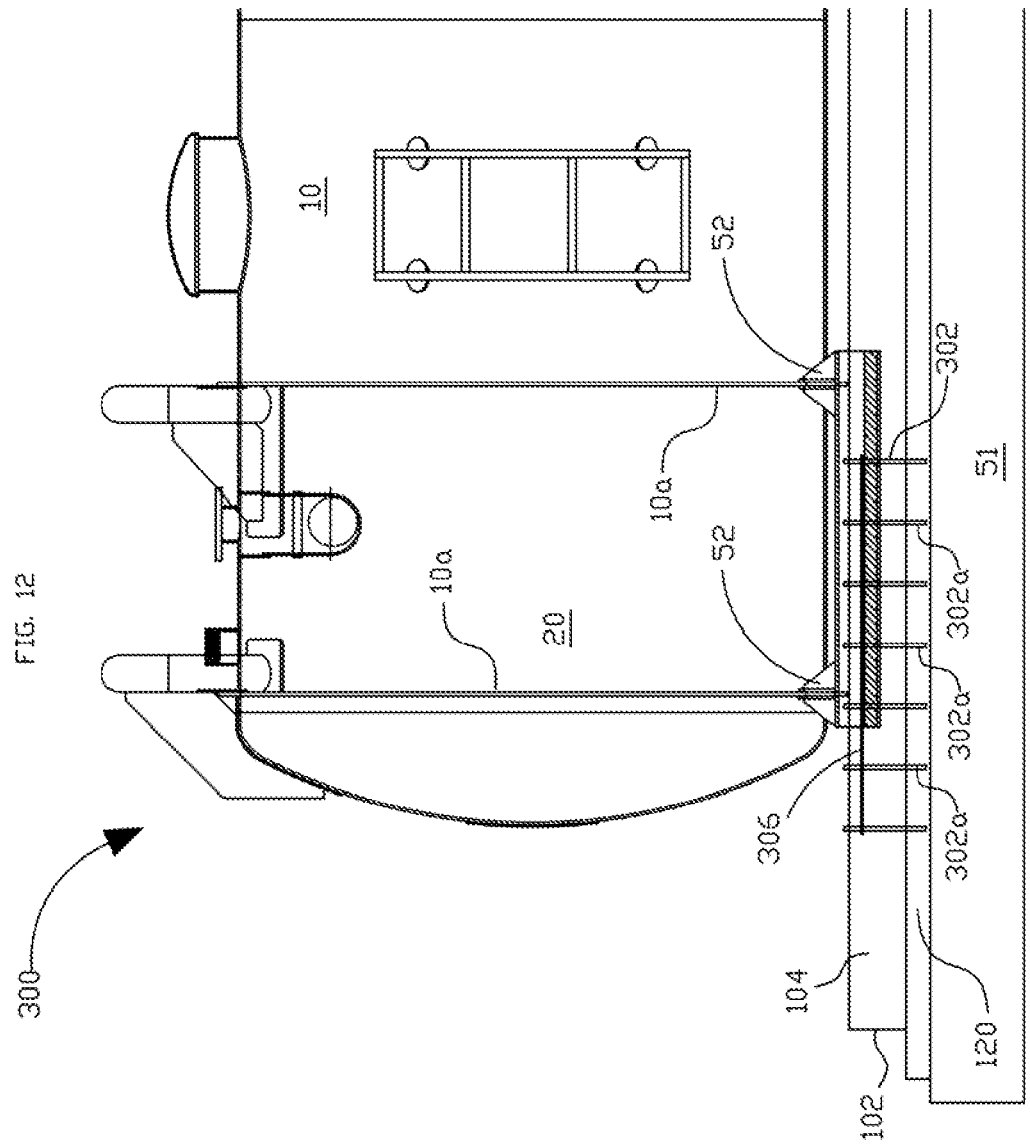

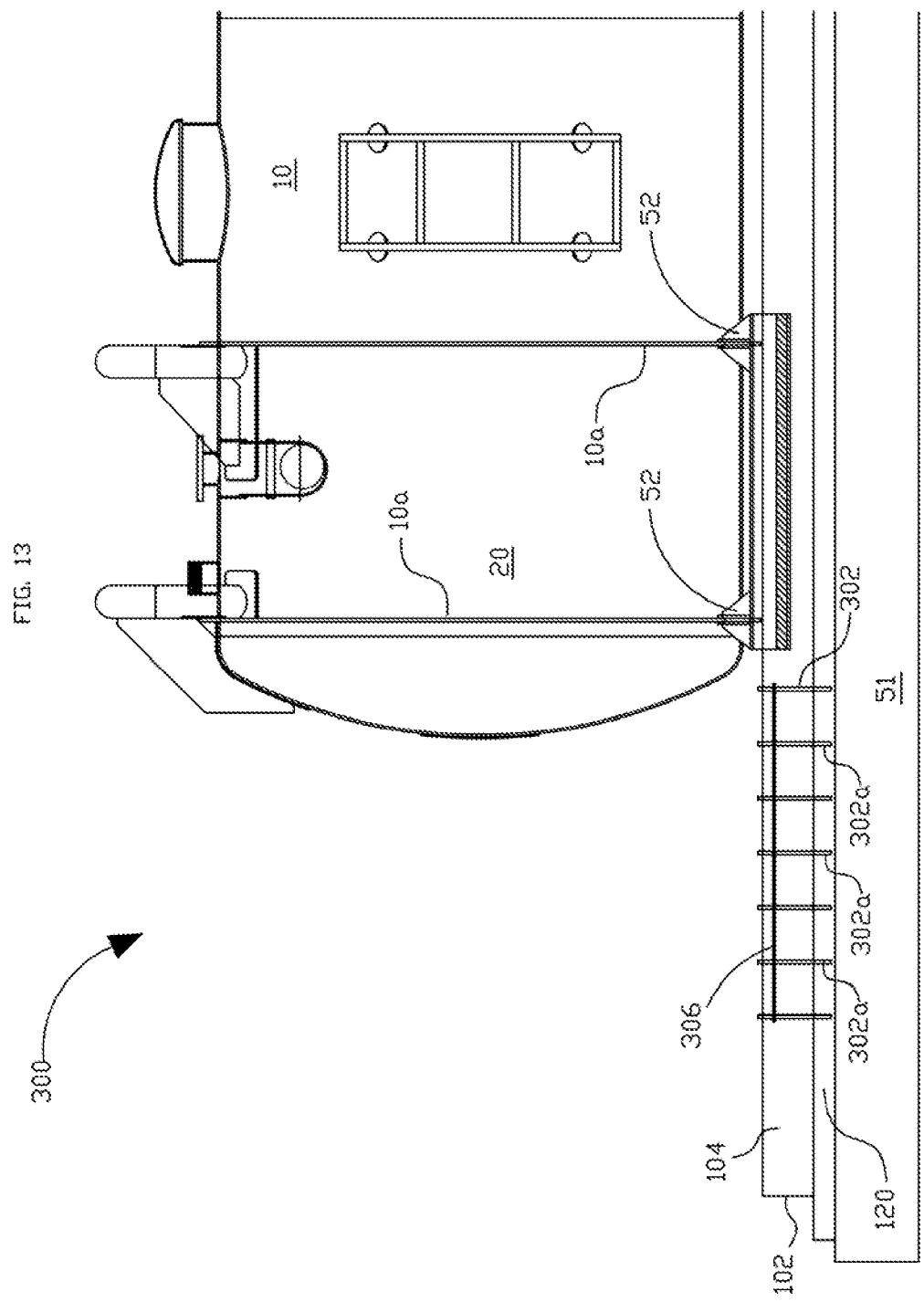

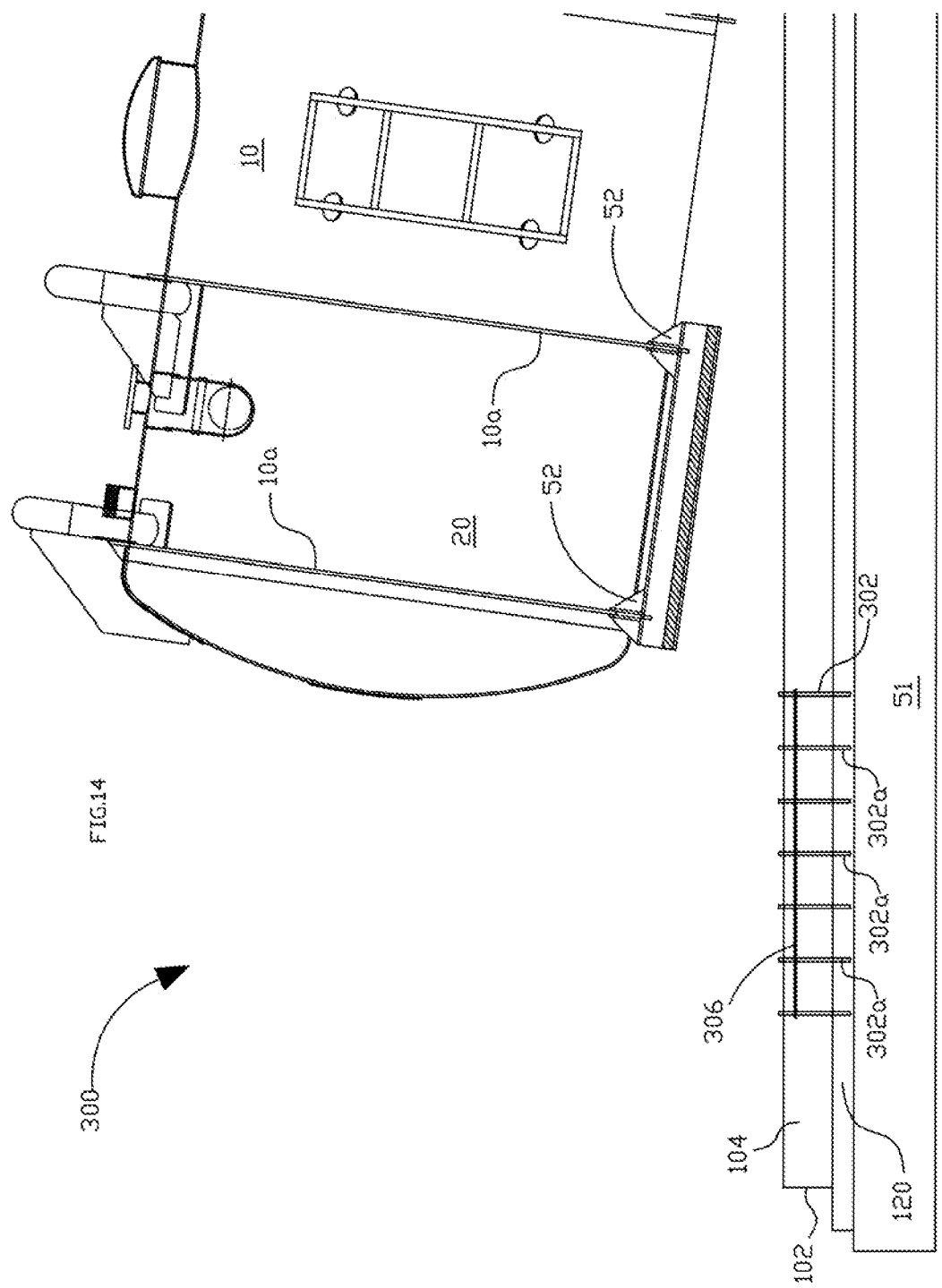

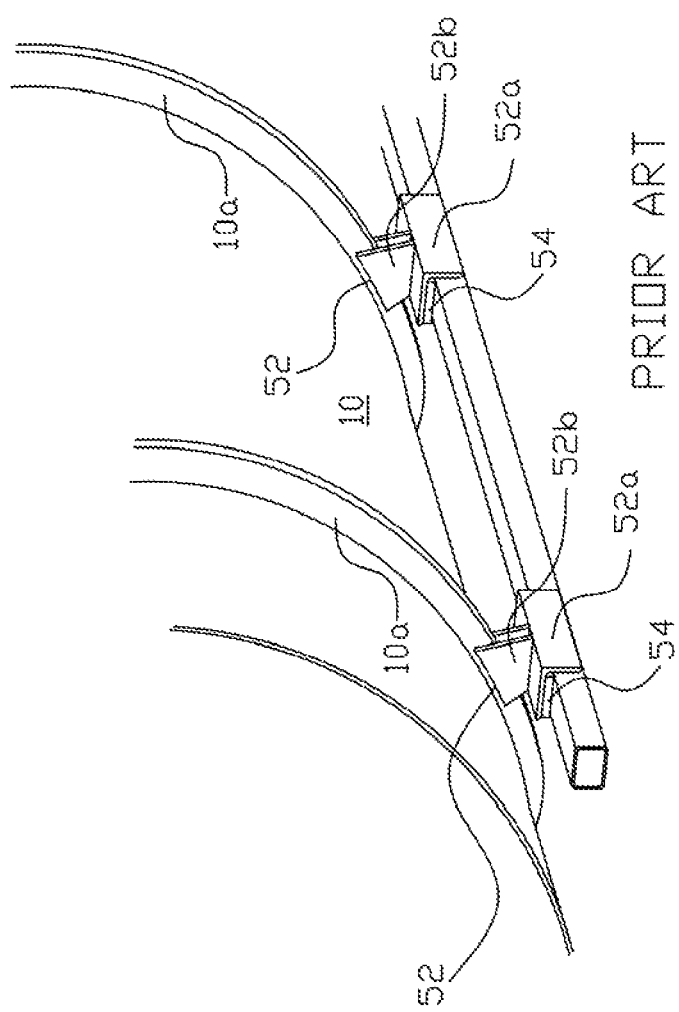

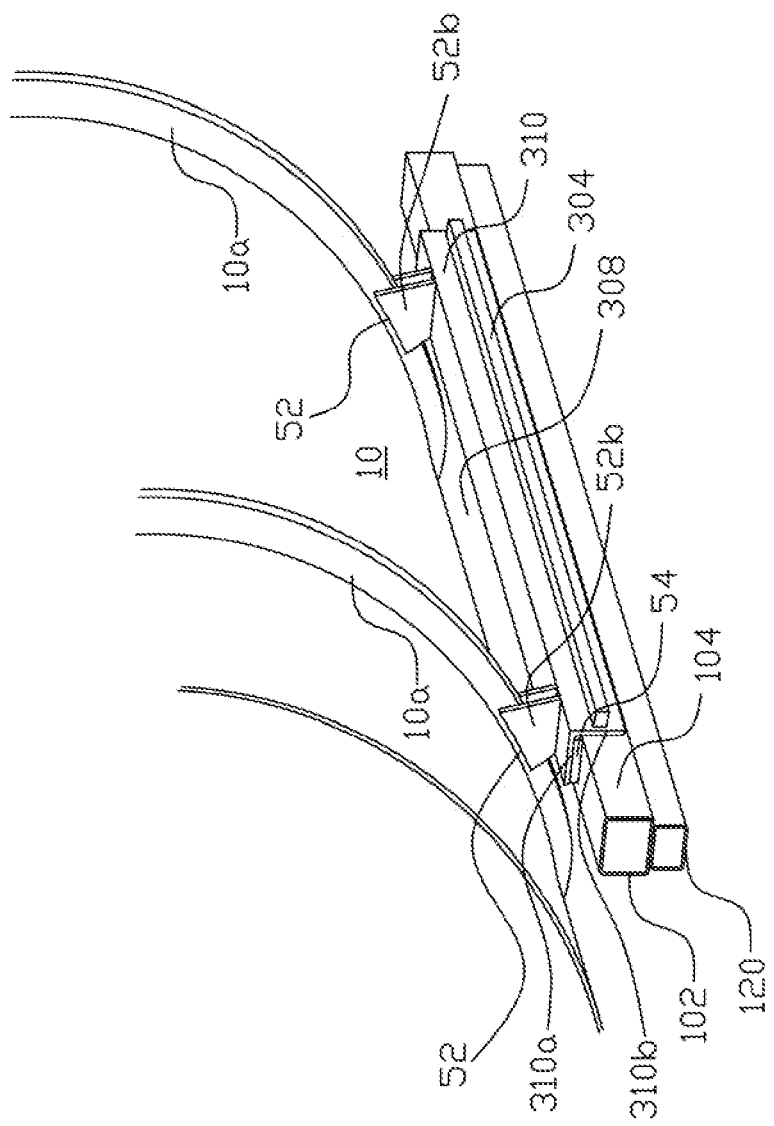

SYSTEM FOR ADJUSTING OVER-AXLE WEIGHT OF A VACUUM TANK TRUCK

FIELD

At least some example embodiments relate to cargo transport vehicles, and for example, to vacuum tank trucks for loading, transporting, and off-loading liquid, semi-solid, and/or solid waste materials.

BACKGROUND

Typical trucks with vacuum tanks (hereinafter referred to as "vacuum trucks") consist of a cylindrical tank of sufficient construction to withstand a typical external pressure of 15 psi and an internal pressure from 15 psi for non-code tanks to 35 psi for U.S. Department of Transport (DOT)/Transport Canada (TC) 407/412 certified pressure vessels. The tanks are attached to a vacuum pump that may consist of a hydraulically driven air or liquid-cooled vane pump or a much larger, more powerful positive displacement blower or liquid ring vacuum pump.

The tanks on vacuum trucks are typically attached at their rear sides to a pivot or hinge-point at the rear of the truck, about which they are pivoted by a hydraulic dump cylinder operably coupled to the front of the tank (i.e., that end of the tank facing the front of the truck). In this manner, a hatch or door on the rear of the tank can be opened, the tank can be propelled upward at its front end so as to pivot about the pivot-point, and the contents of the tank, previously drawn into the tank by an attached vacuum system, can be discharged to the rear of the truck.

Vacuum trucks are usually subjected to road and bridge axle weight restrictions, and often are not able to take full advantage of the allowable gross weight over the front axle of the truck chassis. Front axles are typically permitted to bear an over-axle weight of 20,000 lbs, while rear axles are typically subjected to restrictions of 32,000 lbs or 40,000 lbs, depending on the jurisdiction. In jurisdictions where the lesser weight restriction is imposed, the typical payload for current vacuum trucks is approximately 15,000 lbs with the rear axles bearing their maximum allowable gross weight of 32,000 lbs and the front axle bearing only approximately 14,500 lbs of a possible 20,000 lbs of allowable over-axle weight. Where local laws allow the heavier rear axle rating, the typical payload increases to approximately 23,000 lbs, with the rear axles bearing their maximum allowable gross weight of 40,000 lbs and the front axle bearing only approximately 15,000 lbs of a possible 20,000 lbs of allowable over-axle weight.

The inability to transfer payload weight to the front axle, in order to scale the truck to its maximum capacity, severely limits the amount of material that can be loaded into the tank and legally hauled over roads and consequently, restricts profitability for the operator.

Further, while a vacuum tank is usually secured to a frame of the truck at the rear of the tank by a hinged connection, typically, the front of the tank simply rests on the frame with only the hydraulic dump cylinder holding down the front end. In some jurisdictions, this arrangement has been determined to be insufficient for securing the tank to the truck in the event of a rollover incident, and as such, regulations have come into effect requiring that all DOT/TC 407/412 cargo tanks certified for hauling hazardous waste incorporate a front tank hold-down.

Furthermore, traditional DOT/TC 407/412 vacuum trucks require that the rear bumper extend rearward from the truck, past the rear valves by a prescribed distance to provide crash protection for the rear valves in the event of a rear-end collision. This typically results in the contents of the tank being dumped onto the bumper, requiring operators to engage in the unsavoury and laborious task of manually cleaning the rear crash protection bumper prior to travelling on the roads. Additionally, hydraulic vibrators are often utilized on the bottom of the tank shell to assist in off-loading stubborn solid or semi-solid residue left in the tank.

Additional difficulties with existing systems may be appreciated in view of the detailed description below.

SUMMARY

There is provided a system for varying the weight over one or more axles of a truck carrying a container, the container, the truck and the one or more axles being arranged in the manner of a vacuum tank mounted on a vacuum truck having a front axle and one or more rear axles, the system comprising: a telescopic subframe comprising one or more elongate structures, each elongate structure having a fixed part and a telescoping part telescopically engaged with the fixed part, and each fixed part fixedly attached to a mounting frame of the truck so that the telescopic subframe lays substantially horizontally on the mounting frame; and one or more hydraulic cylinders operable by a controller, each hydraulic cylinder attached to and operably coupling the truck and the vacuum tank. The vacuum tank is hingedly attached at a rearward portion of the vacuum tank to each of the telescoping parts of the telescopic subframe, the telescoping parts disposed rearward of the fixed parts. In use, the controller is activated to cause an extension stroke of the hydraulic cylinders to cause the vacuum tank to slide rearward away from a front end of the truck.

There is also provided a system for varying the weight over one or more axles of a truck carrying a container, the container, the truck and the one or more axles being arranged in the manner of a vacuum tank mounted on a vacuum truck having a front axle and one or more rear axles, the system comprising: a telescopic subframe comprising one or more elongate structures, each elongate structure having a fixed part and a telescoping part telescopically engaged with the fixed part, each fixed part fixedly attached to a mounting frame of the truck so that the telescopic subframe lays substantially horizontally on the mounting frame; and one or more extension/retraction hydraulic cylinders operable by a controller, each extension/retraction hydraulic cylinder attached to and operably coupling the truck and the vacuum tank. The vacuum tank is hingedly attached at a rearward portion of the vacuum tank to each of the telescoping parts of the telescopic subframe, the telescoping parts disposed rearward of the respective fixed parts. In use, the controller is activated to cause an extension stroke of the extension/retraction hydraulic cylinders or a retraction stroke of the extension/retraction hydraulic cylinders to cause the vacuum tank to slide rearward from a front end of the truck or forward toward the front end of the truck, respectively.

Further there is provided a system for releasably retaining a forward portion of a container to a truck, the container and the truck being arranged in the manner of a vacuum tank slidably mounted on a telescopic subframe of a vacuum truck, the telescopic subframe comprising two elongate structures spaced apart on a horizontal plane, each elongate structure comprising a fixed part and a telescoping part telescopically engaged with the fixed part, the fixed part fixedly attached to a mounting frame of the truck so that the telescopic subframe lays substantially horizontally on the mounting frame, the forward portion of the vacuum tank having two fixedly attached tank feet disposed on each of opposite sides of an underside of the vacuum tank, the vacuum tank being hingedly attached on opposite sides of a rearward portion of the vacuum tank to each of the telescoping parts of the telescopic subframe so that when the telescoping parts moves rearward towards a rear end of the truck, the vacuum tank correspondingly moves rearward, and when the telescoping parts moves forward towards a front end of the truck, the vacuum tank correspondingly moves forward, the system comprising: one or more elongate hold-down structures fixedly mounted to a frame structure of the truck, and an elongate front tank lug fixedly attached to each of the two tank feet disposed on a respective one of the opposite sides of the underside of the forward portion of the vacuum tank, so that each of the elongate front tank lugs spans a gap between each of the two tank feet. Each of the elongate hold-down structures defines a retaining slot dimensioned for slidable engagement with each of the elongate front tank lugs. In use, when the vacuum tank is slid from an extended position whereat each of the elongate front tank lugs is clear of each of the respective elongate hold-down structures, forward toward the front end of the truck, each of the elongate front tank lugs is slidably engaged by each of the respective elongate hold-down structures so that the elongate hold-down structures substantially restrict vertical and lateral movement of the vacuum tank.

BRIEF DESCRIPTION OF THE DRAWINGS

For a better understanding of present example embodiments, and to show more clearly how it may be carried into effect, reference will now be made, by way of example, to the accompanying drawings which show exemplary embodiments in which:

FIG. 10 is a side view of the embodiment shown in FIG. 7 showing the vacuum tank elevated to a full dumping angle.

FIG. 11 is a side view of another example embodiment of a system for varying the weight over one or more axles of a truck carrying a vacuum tank.

FIG. 12 is a side view of the embodiment shown in FIG. 11 with the vacuum tank disposed at a first extended position.

FIG. 13 is a side view of the embodiment shown in FIG. 11 with the vacuum tank disposed at a second extended position.

FIG. 14 is a side view of the embodiment shown in FIG. 7 showing the vacuum tank partially elevated.

FIG. 15 is a perspective view of prior art vacuum tank feet.

FIG. 16 is a perspective view of vacuum tank feet constructed in accordance with another embodiment.

DETAILED DESCRIPTION OF EXAMPLE EMBODIMENTS

Figure 1:
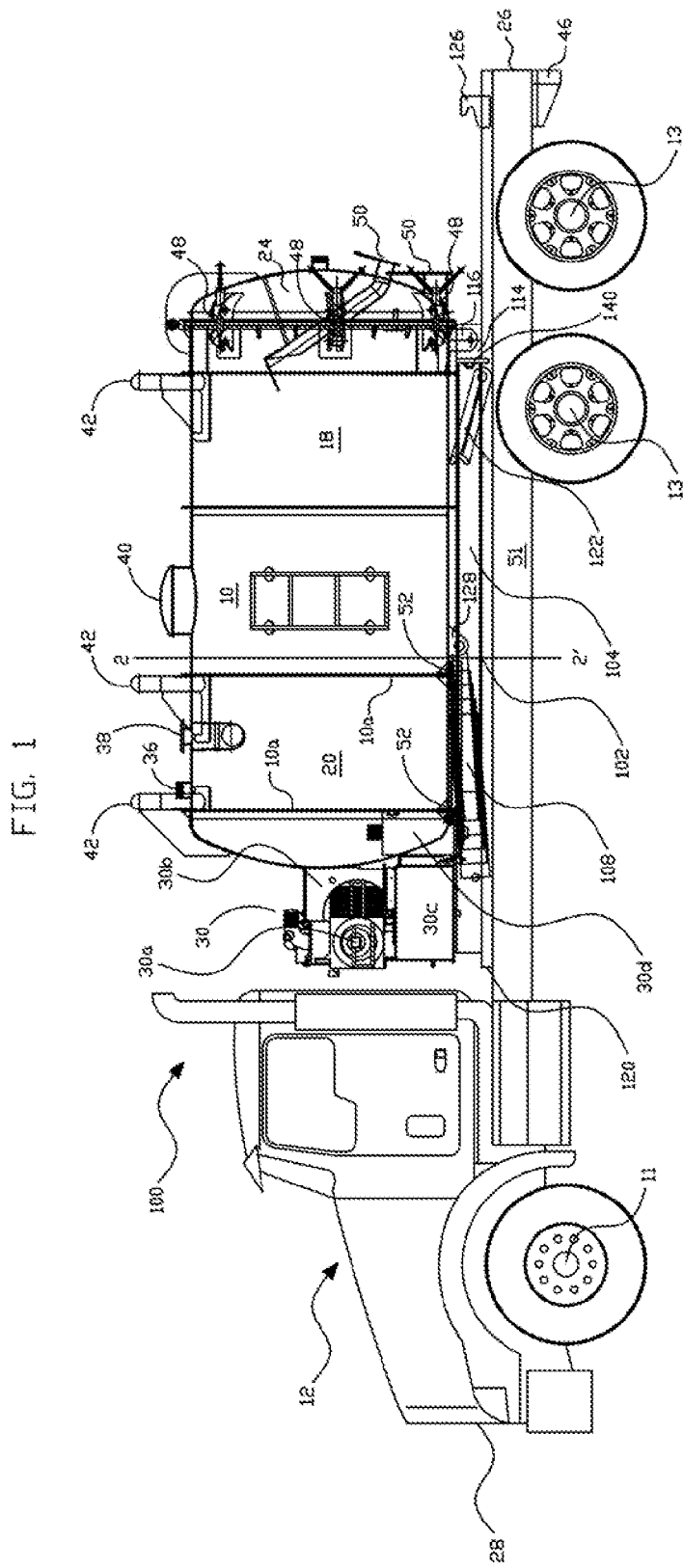
FIG. 1 is a side view of an example embodiment of the system for varying the weight over one or more axles of a truck carrying a vacuum tank.
Figure 2:
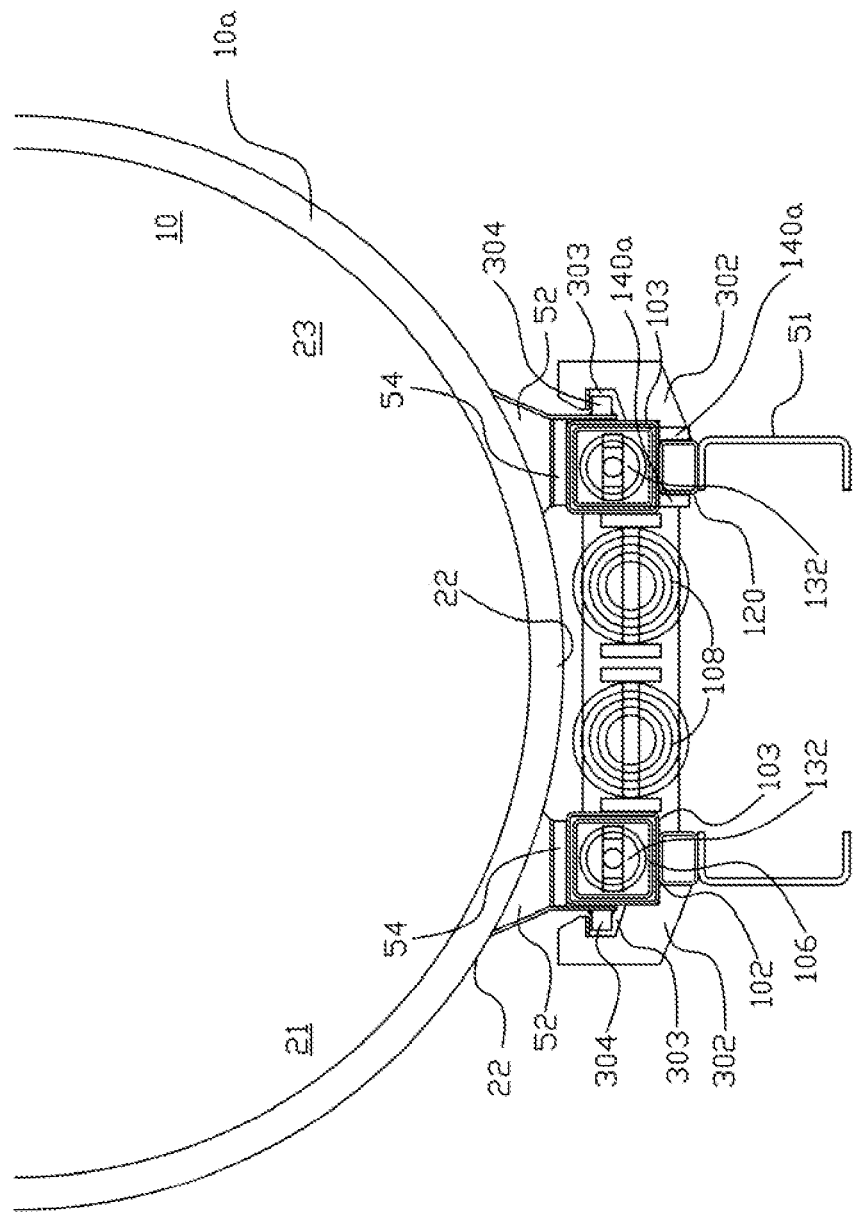
FIG. 2 is a sectional view taken along the line 2-2' of FIG. 1.

FIG. 1, in accordance with an example embodiment, depicts a vacuum truck 12 having a vacuum system 30 comprising, for example, vacuum pump 30a, vacuum pump cooler 30b, hydraulic tank 30c, and secondary filter 30d, and a vacuum tank 10 comprising, for example, pressure relief port 36, internal shut off 38, manway 40, Department of Transport (DOT)/Transport Canada (TC) 407/412 overturn protection (rollover bars) 42, full opening rear door 24, rear door bolts and wingnuts 48, and rear loading valve nozzles 50. The truck 12 has, for example, DOT/TC 407/412 rear crash protection bumper 46, front axle 11 and typically, two rear axles 13. Referring to FIGS. 1 and 2, often vacuum tanks have one or more reinforcing rings 10a to increase the structural stability of the tank. A forward portion 20 of vacuum tanks also typically have one or more fixedly attached tank feet 52 disposed on an underside 22 of the tank. As best shown in FIG. 15, each tank foot typically comprises of a piece of formed, fabricated or structural angle 52a, such as an angle iron, attached to the reinforcing rings with plate steel 52b. The tank feet are typically eight to ten inches in length. The tank feet 52 often include a pad 54, typically formed from a hard plastic or nylon material, to cushion the impact between the vacuum tank and the truck when the tank is lowered from a dumping angle onto the truck. The nylon pads are typically bolted to the bottom of the formed, fabricated or structural angle, and provide replaceable, wearable surfaces to prevent wear of the tank feet and/or the truck frame upon which the tank rests. Certain components such as trim, side trays, fenders, and piping and hose connections to connect the vacuum tank to the vacuum system, have not been shown to de-clutter the drawings so that other components can be more clearly shown. As opposed to conventional tractor-trailers, the system 100 of at least some example embodiments have the tank 10 supported by cassis 51 which is part of the truck 12 itself rather than a separate trailer.

Referring to FIGS. 1 to 6, a system for varying the weight over one or more axles of a truck 12 carrying a vacuum tank 10, constructed in accordance with an embodiment, is noted generally by reference numeral 100. In most cases, system 100 comprises a telescopic subframe 102 and one or more hydraulic cylinders 108 operable by a controller. Typically, the telescopic subframe comprises one or more elongate structures 103. In most embodiments, it is expected that the telescopic subframe will comprise two elongate structures 103 spaced apart on a horizontal plane, each disposed underneath the vacuum tank on opposite sides 21, 23 of the vacuum tank. Each of the elongate structures will typically have a fixed part 104 that is fixedly attached to a mounting frame of the truck, and a telescoping part 106 that is telescopically engaged with the fixed part. Where the vacuum tank has tank feet 52, it is expected that the tank feet will rest atop the telescopic subframe, and in particular the fixed part of the telescopic subframe, when the tank is horizontally disposed. The mounting frame is typically one of chassis 51 and support frame 120, the latter disposed between the telescopic subframe and the chassis so that each of the fixed parts of the telescopic subframe is fixedly attached to the support frame and the support frame is fixedly attached to the chassis so that the support frame and the chassis support the telescopic subframe and the vacuum tank thereon. In most cases, it is expected that the telescopic subframe will lie substantially horizontally on the mounting frame, and that each fixed part 104 will be attached to the mounting frame by welding, U-bolting, or any other suitable means for secure attachment.

Typically, each of the hydraulic cylinders 108 will be attached to the truck at one end of the cylinder and to the vacuum tank at the other end of the cylinder to operably couple the truck and the vacuum tank. The vacuum tank is also hingedly attached at a rearward portion 18 to each of the telescoping parts of the telescopic subframe, typically to protruding segments 114. The protruding segment is that part of the telescoping part that protrudes by a certain length from the respective fixed part of the telescopic subframe when the telescopic subframe is fully retracted. The vacuum tank will typically be attached to the telescoping parts by one or more rear tank hinges 116, the hinged connection facilitating radial movement of the tank about the hinges to permit the tank to be pivoted from a horizontal orientation to a full dumping angle, and vice versa. It is expected that the telescoping parts will be disposed rearward (i.e. toward a rear end 26 of the truck) of the fixed parts to which they are telescopically engaged. In this way, the controller can be activated to cause an extension stroke of the hydraulic cylinders to cause the vacuum tank to slide rearward away from front end 28 of the truck, typically from a forward position where the hydraulic cylinders are fully retracted, to one or more extended positions. As nylon pads 54 are expected to have a lower coefficient of friction than steel, the tank feet are expected to be able to slide over the telescopic subframe with relative ease.

In most instances, hydraulic cylinders 108 will be multi-stage extension/lift cylinders operable to both extend (i.e. move rearwards) and lift, about a pivot point, the vacuum tank. Extension/lift hydraulic cylinders 108 each have at least a cylinder base 110 and a rod 121 telescopically coupled to the cylinder base, the rod being the part of the hydraulic cylinder attached to and moved by a piston within the cylinder. In some instances, the extension/lift hydraulic cylinders will be double-acting cylinders capable of exerting retraction force, in which case the controller can further be activated to cause a retraction stroke of the extension/lift hydraulic cylinders to cause the vacuum tank to slide forward toward the front end of the truck. In other cases, the multistage extension/lift hydraulic cylinders will be single-acting in that they only exert extension force and are incapable of applying any retraction pressure and therefore incapable of exerting a retraction force.

Referring to FIG. 2, where system 100 comprises single-acting multi-stage extension/lift hydraulic cylinders 108, which tend not to have retraction power, longitudinal retraction of the vacuum tank from one of the extended positions to a forwardly disposed position, such as another extended position or the forward position, can be facilitated by one or more retraction cylinders 132 operably coupling the truck and the telescoping parts of the telescopic subframe. Retraction cylinders 132 may also be used to facilitate vacuum tank retraction where double-acting multi-stage extension/lift hydraulic cylinders, capable of both extension and retraction, are used, as multi-stage cylinders generally tend to have less retraction power than they do extension power. The same or a separate controller can be coupled to the retraction cylinders in order to activate the retraction stroke to cause forward movement of the vacuum tank. Each retraction cylinder 132 is, in most cases, expected to be disposed within a respective one of the elongate structures of the telescopic subframe such that the cylinder base of the retraction cylinder is attached to the fixed part of the telescopic subframe, and the rod of the retraction cylinder, which is telescopically coupled to the cylinder base, is attached to the telescoping part of the telescopic subframe.

It is expected that in most cases, the retraction cylinder will be a single-stage hydraulic cylinder, which cylinders tend to have substantially the same retraction power as they do extension power.

The cylinder base of the extension/lift hydraulic cylinders is typically hingedly attached to a frame structure of the truck. The frame structure is typically one of fixed part 104 of telescopic subframe 102, chassis 51 and support frame 120. As shown in FIG. 1, the rod of each extension/lift hydraulic cylinder is typically hingedly attached to the vacuum tank by one or more tank hinges 128 at a location rearward from the cylinder bases.

System 100 facilitates longitudinal movement of a vacuum tank mounted atop a vacuum truck in order to shift the weight over the front and/or rear axles of the truck. The vacuum tank typically is slidable rearward, from a forward position at which the hydraulic cylinders are fully retracted (i.e. when the vacuum tank is closest to the front end of the truck, as shown in FIG. 1), to one or more extended positions, and is slidable forward, towards the front end of the truck, from any of the extended positions to another of the extended positions that is forwardly disposed, or to the forward position. In most cases, it is expected that the vacuum tank and the axles will be arranged so that longitudinal movement of the vacuum tank varies the weight over the front axle of the truck while the weight distribution over one or more rear axles remains substantially unchanged.

System 100 is therefore adaptable to various over-axle weight requirements by allowing the vacuum tank to be slid to various longitudinal positions along the mounting frame of the truck. Where the over-axle weight restrictions are 20,000 lbs for the front axle and 32,000 lbs and 40,000 lbs, depending on the jurisdiction, for the rear axle(s), system 100 can be adapted such that there are three discrete positions for the vacuum tank: the forward position, shown in FIG. 1; a first extended position, shown in FIG. 3; and a second extended position, shown in FIG. 4. In this embodiment, the forward position and the first extended positions are transport positions whereat the vacuum truck can haul the vacuum tank and contents therein over roadways. The second extended position is an operating position. In the operating position, rear door 24 of the vacuum tank is disposed proximate rear end 26 of the truck to facilitate loading or unloading of the vacuum tank by an operator from behind the truck. Where the 32,000 lb rear axle weight restriction is imposed, weight can be shifted off of the rear axle(s) by longitudinally sliding the vacuum tank forward, for example, to the forward position. Where the higher 40,000 lb rear axle weight restriction is imposed, more of the weight of the vacuum tank and the contents therein can be shifted to the rear axle(s) by longitudinally sliding the vacuum tank rearward, for example, to the first extended position. In either case, the ability to dispose the vacuum tank over the axles of the truck in varying longitudinal positions is expected to allow the operator to take full advantage of the allowable front axle over-axle weight limits and thereby maximize the amount of payload carried within the tank.

Figure 3:
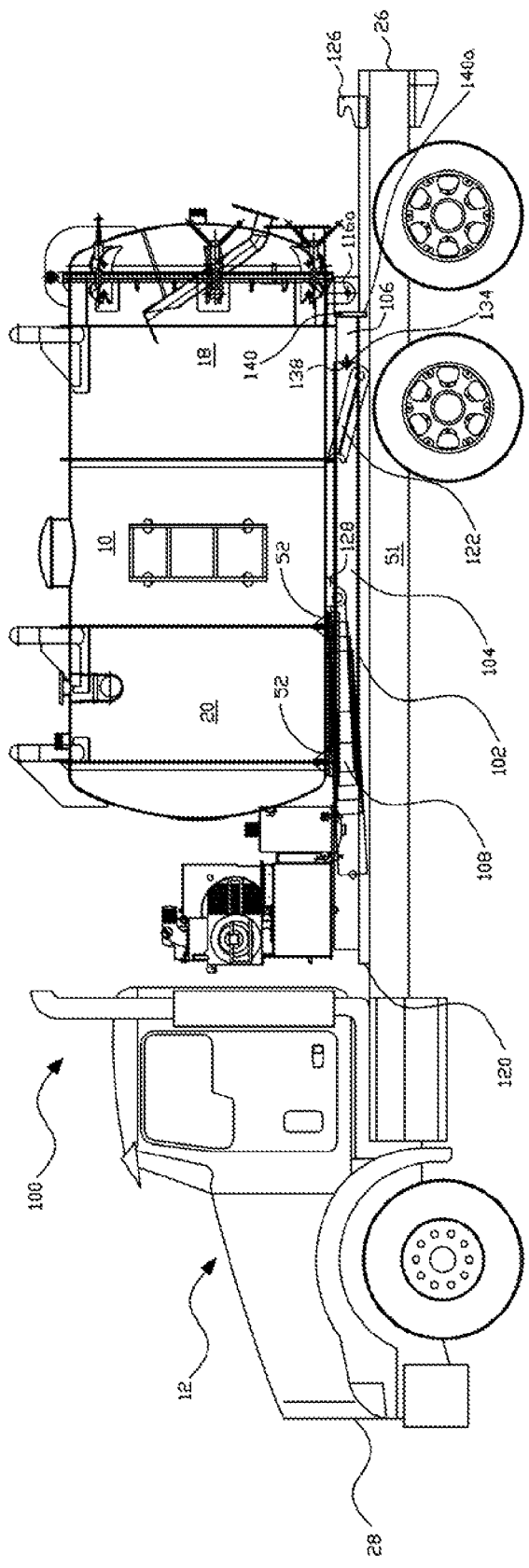
FIG. 3 is a side view of the embodiment shown in FIG. 1 with the vacuum tank disposed at a first extended position.
Figure 4:
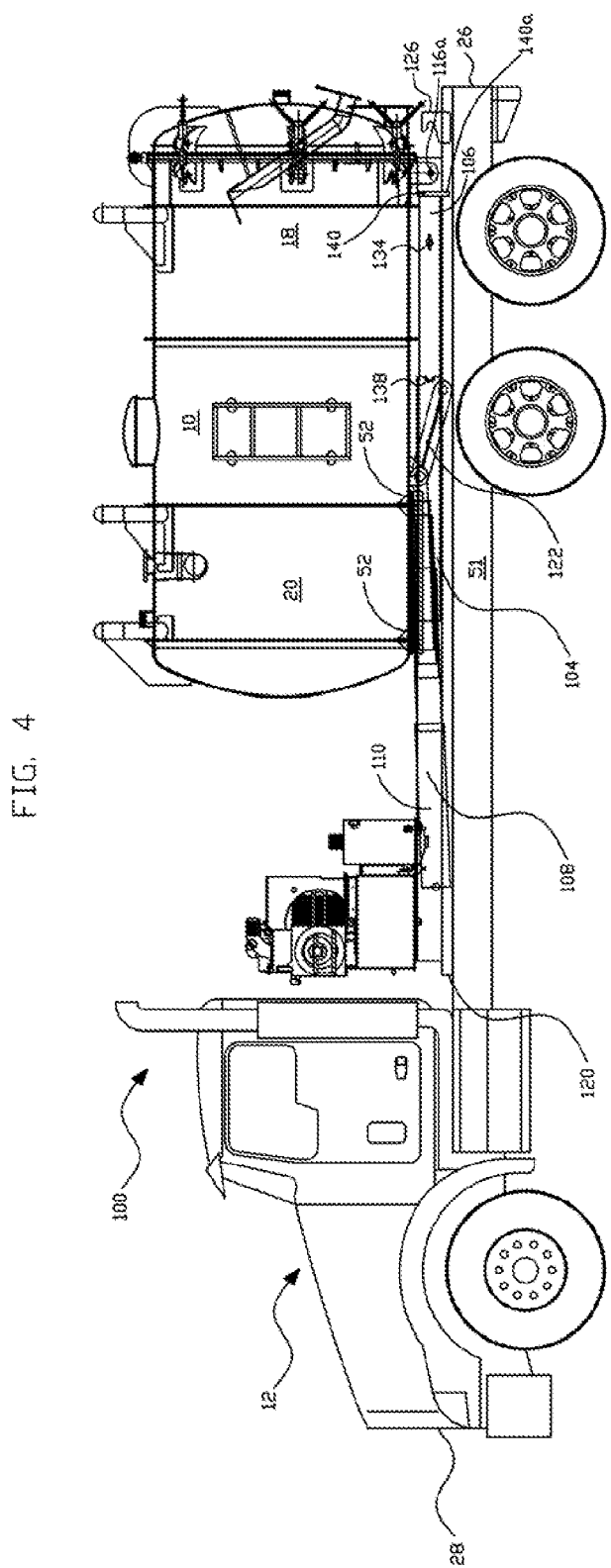
FIG. 4 is a side view of the embodiment shown in FIG. 1 with the vacuum tank disposed at a second extended position.

Referring to FIGS. 1 and 3 to 6, in most cases, system 100 includes one or more transitional lift arms 122 in order to facilitate the lifting of the vacuum tank by extension/lift hydraulic cylinders 108. Each transitional lift arm is typically an elongate metallic structure having free end 124, and is typically hingedly attached to the truck, in most cases to the frame structure. Typically, the free end is shaped and dimensioned to releasably receive tank hinge pin 128*a* of one of the respective tank hinges, and is upwardly forwardly biased relative to the hinge point of the transitional lift arm, typically by a spring (not shown) operably coupled to the lift arm so that each lift arm is spring-loaded. In the embodiment shown, when the vacuum tank is slid from the forward position rearward, each tank hinge pin releasably engages a respective free end of the transitional lift arms when the vacuum tank is at the operating position. In other words, when the vacuum tank is slid back to the second extended position or operating position, the tank hinge pins on the underside of the vacuum tank are releasably received within the accommodatingly-shaped free end of the transitional lift arms while the tank is still horizontally disposed, as best shown in FIG. 4.

The transitional lift arms are arranged and disposed such that the releasable engagement between the tank hinge pins and the lift arms causes the substantially horizontal extension or pushing force of the extension/lift hydraulic cylinders to be substantially converted into a vertical lifting force as the lift arms pivot upward about their hinge points so as to correspondingly move the releasably engaged extension/lift hydraulic cylinders correspondingly radially upward, a motion facilitated by the initially upwardly forwardly biased position of the transitional lift arms. In some cases, the cylinder base of the hydraulic cylinders may be attached to the frame structure on a horizontal plane that is below the point of attachment between the rod and the vacuum tank (i.e. below the tank hinges and therefore the tank hinge pins), so that the hydraulic cylinders, typically extension/lift hydraulic cylinders 108, are also upwardly biased, further facilitating the conversion of the horizontal extension force to the vertical lift force upon engagement with the transitional lift arms when the cylinders are progressing through an extension stroke.

It is expected that the transitional lift arms will reduce the forces transmitted by the extension/lift hydraulic cylinder(s) into the vacuum tank shell during the initial stages of the dumping process. These forces are expected to be substantially contained within the telescopic subframe and result in a substantially vertical lift component being transferred into the vacuum tank shell to raise the tank until the rear tank hinge pins have contacted the rear tank slide stop, at which time the tank will pivot about this point, allowing the extension/lift hydraulic cylinder(s) to raise the tank off of the transitional lift arms. Based on the placement of the hydraulic cylinder mounts on the vacuum tank (i.e. where the cylinders hingedly attach to the tank), and assuming a uniform load inside the tank, it is expected that this force will be sufficient to lift a 60,000 lb load (including the weight of the tank shell), a force that is expected to be sufficient for lifting the vacuum tank even where the tank is loaded in excess of normal over-the-road weight limits.

Figure 5:
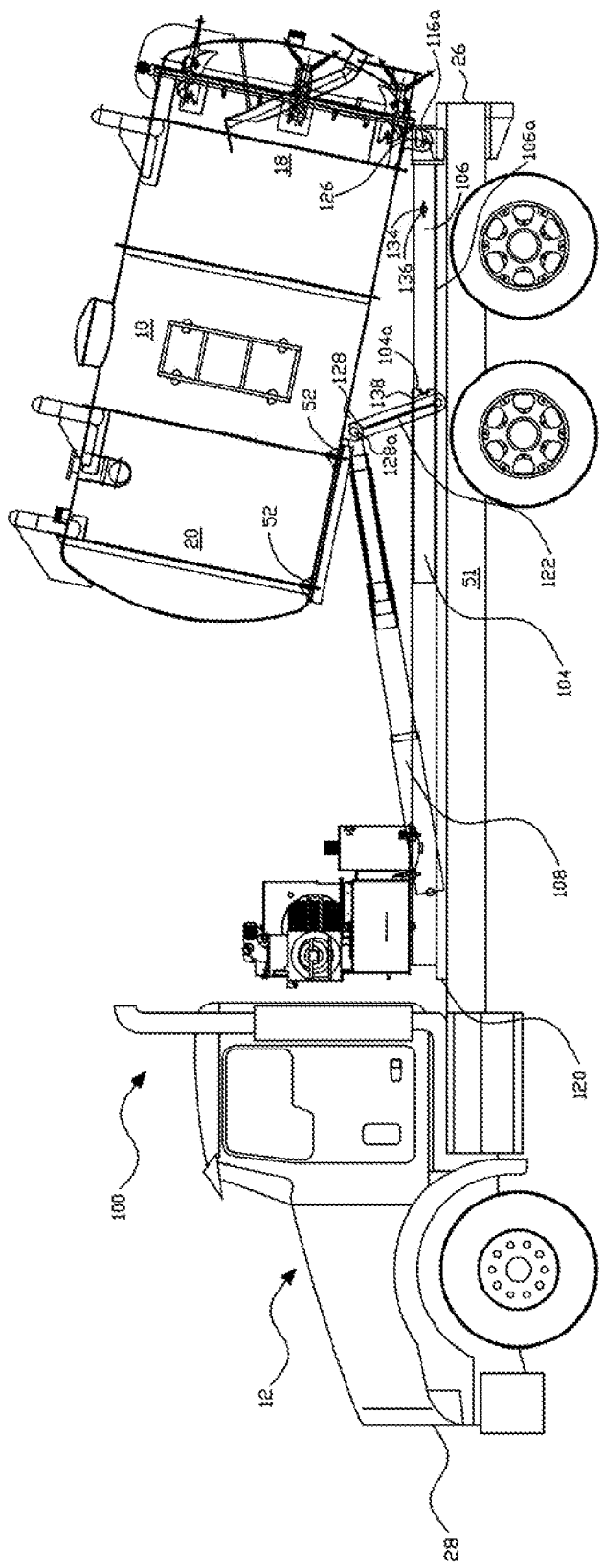
FIG. 5 is a side view of the embodiment shown in FIG. 1 showing the vacuum tank partially elevated.

The further activation of the extension/lift hydraulic cylinders when the tank hinge pins are releasably engaged by the free ends of respective transitional lift arms causes a transitional lift movement. During the transitional lift movement, the vacuum tank pivots upward while sliding longitudinally rearward until one or more rear tank hinge pins 116*a* of the respective rear tank hinges becomes releasably engaged by one or more rear tank slide stops 126. The rear tank slide stop will, in most cases, be welded to the mounting frame, although other means for secure attachment are within the scope of this disclosure. FIG. 5 shows the vacuum tank when it is contacted by the rear tank slide stops, which prevent further longitudinal rearward movement of the vacuum tank. In most cases, each tank hinge pin will remain releasably engaged with a respective free end of the transitional lift arms for the duration of the transitional lift movement. For example, FIG. 5 shows the point at which the transitional lift movement has just completed, the tank hinge pin shown remaining engaged with the respective free end.

It is expected that when the tank hinge pins releasably engage the free ends, a natural stopping position for the extension/lift hydraulic cylinders is encountered, as the force required to move beyond this point will be substantially more than to simply slide the vacuum tank rearward. The additional force required to continue the extension stroke results in feedback to the operator through the controller when this position is reached. The controller is therefore provided with the information necessary to know when the operating position has been reached, and can opt to cease the extension stroke at that time in order to dispose the vacuum tank at the operating position, or alternatively, apply the additional force required to begin the transitional lift movement.

Figure 6:
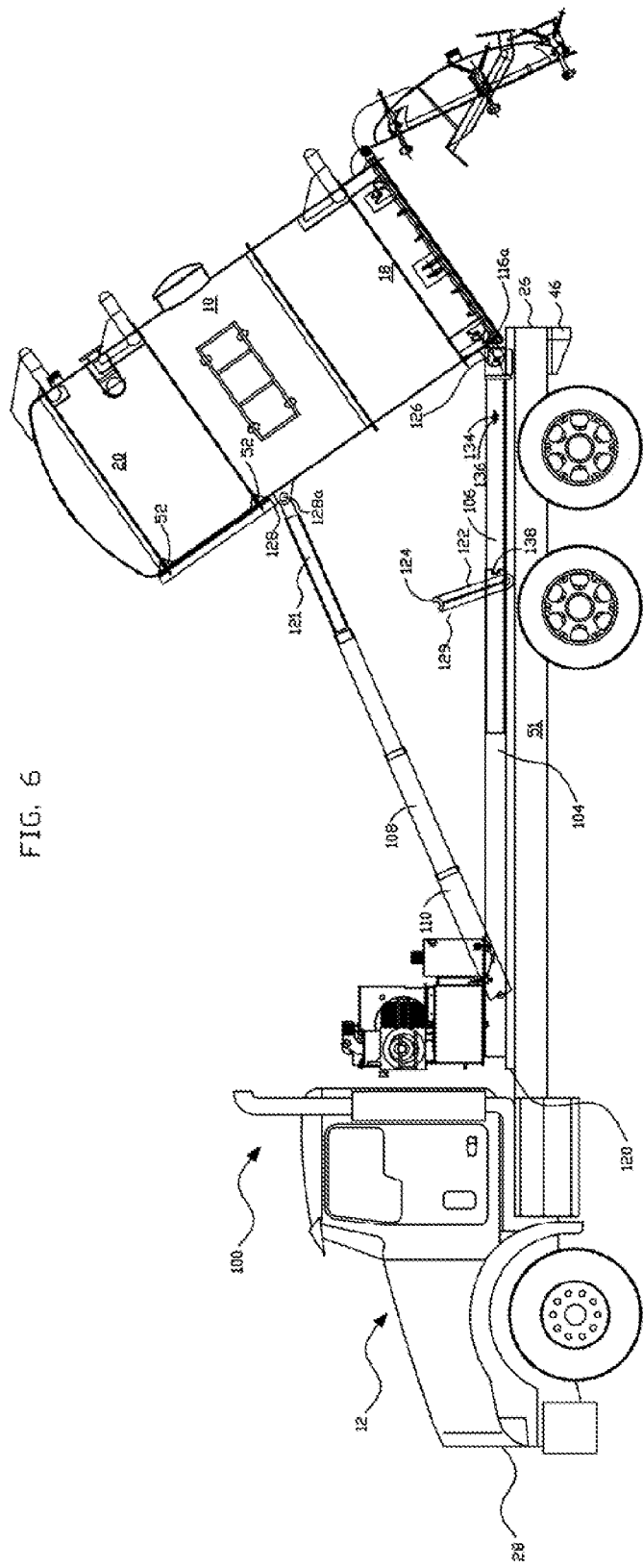
FIG. 6 is a side view of the embodiment shown in FIG. 1 showing the vacuum tank elevated to a full dumping angle.

The rear tank slide stops provide a fulcrum which, in conjunction with the releasably engaged rear tank hinges, facilitate upwardly radial movement of the vacuum tank about the rear tank slide stops when the extension stroke of the extension/lift hydraulic cylinders is continued past the transitional lift movement. In other words, further activation of the extension/lift hydraulic cylinders when each of the rear tank hinge pins has engaged the respective rear tank slide stops causes the vacuum tank to pivot about the rear tank slide stops to lift the vacuum tank away from the transitional lift arms, as shown in FIG. 6. It is expected that when the extension/lift hydraulic cylinders are fully extended, the vacuum tank will be disposed at a full dumping angle, although in some cases, the tank may reach the full dumping angle before full extension of the cylinder is achieved. In the latter scenario, in an example embodiment, the tank may be prevented from pivoting past, or substantially past, the full dumping angle by a mechanical stopping device (not shown), which, for example, may have some flexible resilience or may be spring-loaded so that the operator can move the tank back and forth while engaged with the stopping device so as to "shake" contents from the vacuum tank.

Referring to FIG. 6, once the vacuum tank moves away from the free ends of the transitional lift arms, in most cases it is expected that the transitional lift arms will remain upwardly biased at engagement position 129. The engagement position represents an orientation of the transitional lift arms at which the free ends are operably disposed such that they are releasably engaged by the respective tank hinge pins when the vacuum tank descends onto the transitional lift arms. In other words, the free ends of the transitional lift arms are left disposed upward, free in space, on a radial arc path that is followed by the tank hinge pins as the vacuum tank is raised to the full dumping angle, so that the free ends are positioned to be engaged by the tank hinge pins again when the vacuum tank is lowered. The releasable engagement of the tank hinge pins with the free ends of the transitional lift arms as the vacuum tank is lowered is expected to facilitate the lowering of the vacuum tank, as the transitional lift arms will absorb a portion of the vertical forces exerted by the tank. In some instances, the spring-loaded transitional lift arms are disposed at the engagement position when the spring is no longer under compression. In other embodiments, the upwardly biased transitional lift arms will be prevented from pivoting past the engagement position by a lift arm stopper device (not shown) operably coupled to the transitional lift arms to prevent movement past the engagement position. Other mechanisms for maintaining the transitional lift arms at the engagement position are conceived to be within the scope of the present disclosure.

Referring to FIGS. 7 to 10, a system for varying the weight over one or more axles of a truck 12 carrying a vacuum tank 10, constructed in accordance with another embodiment, is noted generally by reference numeral 200. Similar reference numbers may be used for convenience of reference only. System 200 is as described above in respect of system 100, although, whereas system 100 uses extension/lift hydraulic cylinders in conjunction with transitional lift arms to extend (i.e. move rearward) and pivot upwards the vacuum tank, while using in most cases a separate retraction assist cylinder for facilitating retraction of the telescopic subframe and the vacuum tank, system 200 employs a different combination of cylinders. Specifically, in most instances is expected that system 200 will have one or more extension/retraction hydraulic cylinders 202 that are operable by a controller. Each extension/retraction hydraulic cylinder will attach to and operably couple the truck and the vacuum tank. In most cases, it is expected that the extension/retraction hydraulic cylinders will be single stage cylinders which, as described, tend to have substantially the same retraction power as they do extension power.

In most cases, it is expected that each extension/retraction hydraulic cylinder will be disposed within a respective elongate structure of the telescopic subframe, the cylinder base of the extension/retraction hydraulic cylinder attached to the fixed part of the telescopic subframe, and the rod 121 of the extension/retraction hydraulic cylinder attached to the telescoping part of the telescopic subframe, so that activation of an extension or retraction stroke by the controller causes extension or retraction, respectively, of the telescopic subframe and the vacuum tank hingedly attached thereto, as previously described. System 200 therefore includes, in most cases, a single stage extension/retraction hydraulic cylinder responsible for longitudinal rearward and forward movement of the vacuum tank.

Unlike system 100, system 200 will use one or more separate dedicated dump cylinders 204, in most cases operable by a second controller separate from the controller for the extension/retraction hydraulic cylinders, responsible for raising the forward portion of the vacuum tank when the rear tank hinge pins of the tank are engaged by the rear tank slide stops, in order to pivot the tank to its full dumping angle. It is expected that, in most instances, each of the dedicated dump cylinders will be hingedly attached to forward portion 20 of the vacuum tank at a respective front hinge 10*b*, and mounted atop a respective movable cross member 206 that is adapted to be slidable over the telescopic subframe. It is expected that the dedicated dump cylinders will be single acting multistage hydraulic cylinders capable only of exerting extension force, although double-acting cylinders capable of both extension and retraction force may be used.

Figure 7:
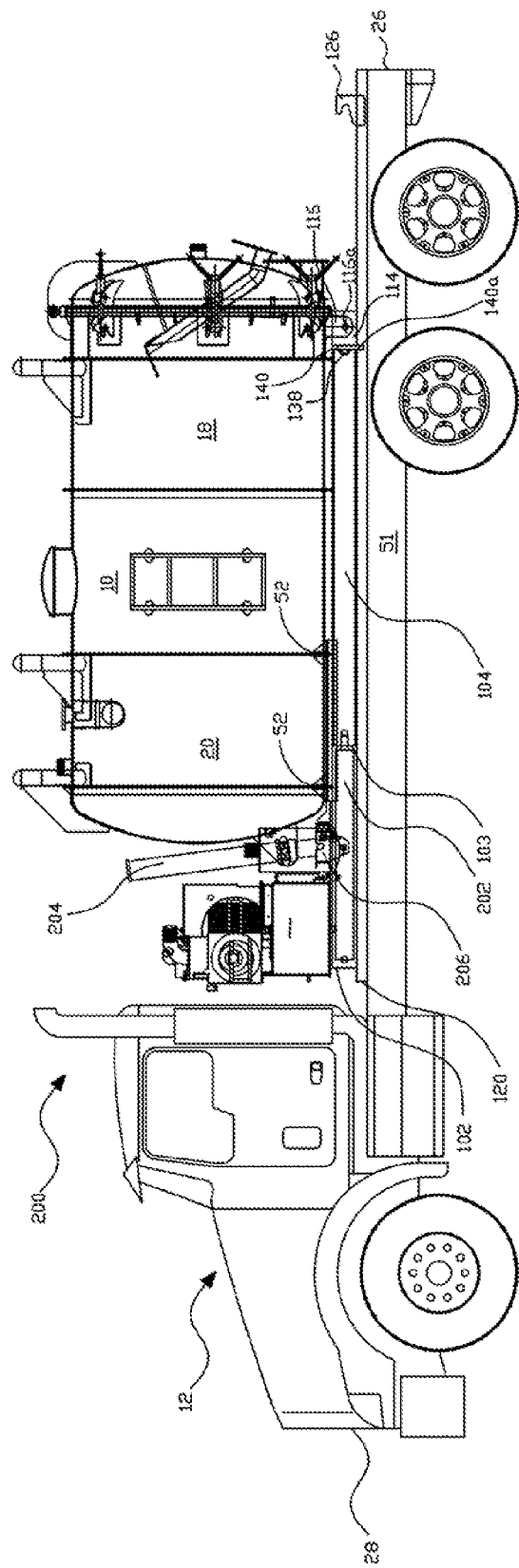
FIG. 7 is a side view of another example embodiment of a system for varying the weight over one or more axles of a truck carrying a vacuum tank.
Figure 8:
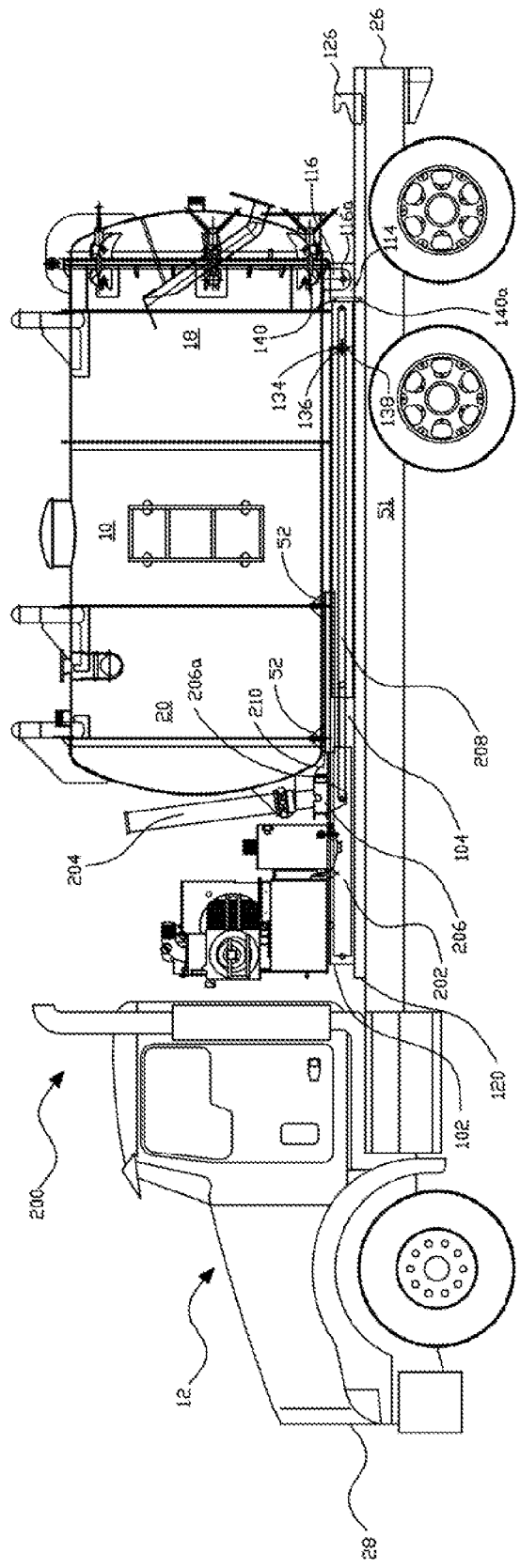
FIG. 8 is a side view of the embodiment shown in FIG. 7 with the vacuum tank disposed at a first extended position.
Figure 9:
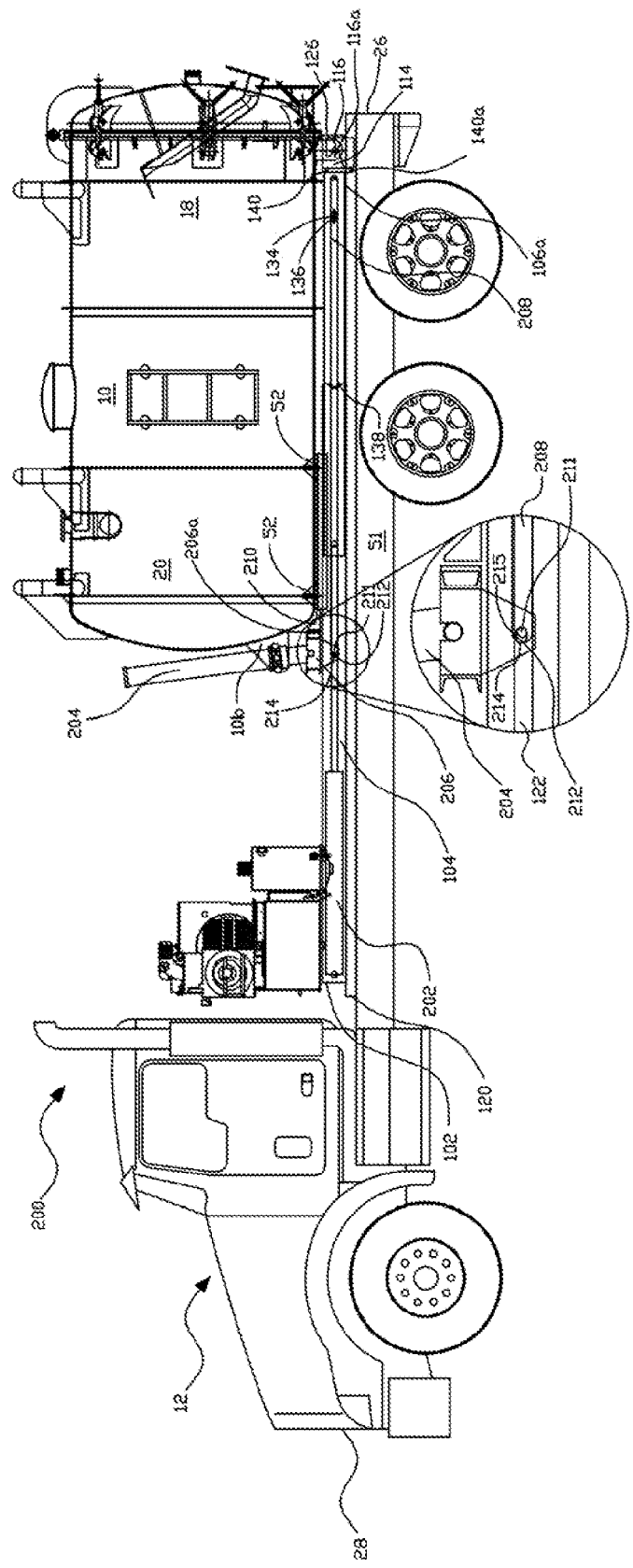
FIG. 9 is a side view of the embodiment shown in FIG. 7 with the vacuum tank disposed at a second extended position.

In most cases, in order to prevent the dedicated dump cylinders from rotating about their hinged connections with the vacuum tank so as to contact the tank during extension or retraction strokes, the movable cross members are disposed such that they bias the dedicated dump cylinders at an angle relative to the vacuum tank that prevents contact between the dump cylinders and the tank other than at the hinged connection, as shown in FIGS. 7-9. The bias is substantially maintained by use of a respective one or more coupling rods 208 (not shown in FIG. 7 to more clearly show extension/retraction hydraulic cylinder 202 disposed within elongate part 103), each coupling rod attaching a respective movable cross member to a respective one of telescoping parts 106 of the telescopic subframe so that activation of the extension stroke causes each coupling rod and correspondingly the respective movable cross member and the dedicated dump cylinder thereon to correspondingly move rearward in a manner that maintains the bias of the dedicated dump cylinders. Rearward movement of the dedicated dump cylinders during an extension stroke is therefore facilitated both by the hinged connection of the dump cylinders to the vacuum tank and the coupling rods.

In some cases, it is expected that the coupling rods will be relatively small cross-section metallic rods that may be susceptible to buckling if placed under compression. In these instances, system 200 can include one or more cross member pushers 210 mounted to the forward portion of the vacuum tank, typically to the forwardly disposed tank feet, as shown in FIGS. 8-10. Typically, each respective coupling rod will be attached to the respective movable cross member by a rod pin 211 received within a slotted mounting hole 212 in the movable cross member. As best shown in FIG. 9, the slotted mounting hole is expected to be dimensioned larger than the rod pin, typically by approximately 0.5 inches longitudinally so as to form a longitudinal track 215, to facilitate longitudinal movement of the rod relative to the movable cross member. In most cases, the cross member pushers and the respective coupling rods will be arranged so that, when activation of the retraction stroke of the extension/retraction hydraulic cylinders causes the telescoping parts of the telescopic subframe and correspondingly the vacuum tank to move forward toward the front end of the truck, each cross member pusher will contact a respective movable cross member before the respective rod pin contacts a forward edge 214 of the respective slotted mounting hole. In this way, it is expected that compression of the coupling rods during retraction of the telescopic subframe can be avoided, as each movable cross member and the respective dedicated dump cylinder thereon are moved forward by the respective extension/retraction hydraulic cylinder and the cross member pusher. In some cases, each movable cross member will comprise padded surface 206*a*, similar to pads 54, to reduce wear and tear on the movable cross member and/or the cross member pusher which it contacts. A padded surface may alternatively, or also, be positioned on the contact surface of the cross member pusher. It is also expected that the larger longitudinal dimension of the slotted mounting holes will contribute to the clearance required for the tank feet and the cross member pushers as the vacuum tank is lowered.

In accordance with system 200, as there are no transitional lift arms to facilitate the initial inclination of the forward portion of the vacuum tank before the tank reaches the rear tank slide stops, the operating position need not be at a point before the vacuum tank contacts the rear tank slide stops. Accordingly, the vacuum tank is disposed in the operating position by activation of the extension stroke to cause the vacuum tank to move rearward until one or more rear tank hinge pins 116*a* becomes releasably engaged by respective rear tank slide stops 126. The rear tank slide stops prevent further longitudinal rearward movement of the vacuum tank, and as the extension force exerted on the tank is substantially horizontal, the tank will not pivot about the fulcrum provided by the rear tank slide stops by activation of the extension/retraction hydraulic cylinders. Instead, once the vacuum tank is in the operating position, the operator can activate the dedicated dump cylinders to provide the lifting force necessary to cause the vacuum tank to pivot about the rear tank slide stops to the full dumping angle, as shown in FIG. 10.

Like system 100, system 200 is capable of sliding the vacuum tank to various longitudinal positions, for example, a forward position (as shown in FIG. 7), a first extended position (as shown in FIG. 8), and a second extended position or operating position (as shown in FIG. 9).

Referring to FIGS. 1-10, systems 100 and 200 will, in most instances, be adapted to prevent the vacuum tank from moving forward past the first extended position during a retraction stroke. This will in most cases be accomplished by use of pin 134 and pin stop 138. Particularly, once the vacuum tank is extended to or beyond the first extended position, the operator can insert the pin into pin hole 136 in the respective telescoping part of the telescopic subframe so that the pin is releasably inserted into the pin hole. During the retraction stroke, the inserted pin is contacted by pin stop 138 disposed on rearward edge 104*a* of the respective fixed part of the telescopic subframe. The pin stop will typically be shaped and sized to releasably engage the inserted pin, and the pin hole is expected to be positioned so that when the inserted pin contacts the pin stop, the telescoping part of the telescopic subframe is prevented from retracting the vacuum tank beyond the first extended position.

Systems 100 and 200 are therefore expected to be easily field-adjustable by the insertion of pin 134 to allow the operator to safely work in multiple jurisdictions while taking full advantage or the differing over-axle weight laws in each. In either embodiment, in jurisdictions imposing 20,000 lb and 32,000 lb front and rear axle weight restrictions, respectively, it is expected that with the tank fully retracted to the forward position, as shown in FIGS. 1 and 7, approximately 20,000 lbs can be in the tank during transport (approximately 5000 lbs or approximately 33% more payload than current vacuum trucks) while the front and rear axles bear their maximum allowed over-axle weights of approximately 20,000 lbs and 32,000 lbs, respectively. In jurisdictions imposing the less restrictive 40,000 lb rear axle weight limit, when the pin is inserted to limit forward movement of the vacuum tank past the first extended transport position so that the tank is disposed at the first extended position, as shown in FIGS. 3 and 8, it is expected that approximately 28,000 lbs can be loaded into the tank (approximately 5000 lbs or approximately 22% more payload than current vacuum trucks) while the front and rear axles bear their maximum allowed over-axle weights of approximately 20,000 lbs and 40,000 lbs, respectively.

Referring to FIG. 1-10, in some embodiments, systems 100 and 200 also include one or more telescopic subframe guides 140. Each guide is expected to be fixedly attached to a respective rear tank hinge, and in most cases comprises one or more elongate plates extending below a bottom edge 106*a* of the respective telescoping part of the telescopic subframe on one or more sides of the telescoping part, to define one or more guide members 140*a*. Each guide member is disposed adjacent the mounting frame over which the telescopic subframe is mounted to assist in laterally retaining the vacuum tank during rearward or forward movement of the tank, or when the tank is at rest. It is expected that the guide members will be steel plate structures, although they may be formed from other materials of similar strength and rigidity. The guide members in some cases will comprise low-friction padded contact surfaces, similar to pads 54, to reduce frictional engagement with the mounting frame so as to facilitate sliding movement of the vacuum tank.

Systems 100 and 200 therefore comprise two ways for moving a vacuum tank longitudinally along the chassis of a vacuum truck, while permitting the tank to be tipped for dumping. System 100 typically utilizes extension/lift hydraulic cylinders to move the tank rearward as well as lift and dump it in conjunction with the transitional lift arms which substantially convert the horizontal extension force to vertical lifting force on the vacuum tank shell until the rear tank slide stops are contacted. At this point it is expected that the forces on the tank shell will have been reduced by a factor of approximately two and the hydraulic cylinders can complete the lifting of the vacuum tank. System 200 consists of a dedicated dump cylinder that follows the vacuum tank on its own movable cross member while the tank is extended and retracted via the extension/retraction hydraulic cylinders, which are typically disposed inside the telescopic subframe. When the vacuum tank is extended to the point where it contacts the rear tank slide stops, the dedicated dump cylinder is activated to raise the tank and dump the load. System 100 can also utilize retraction assist hydraulic cylinders inside the telescopic subframe in order to facilitate retraction of the telescoping parts of the telescopic subframe and therefore of the vacuum tank. The described embodiments are expected to facilitate the transference of weight between the front and rear axles to allow operators to fully utilize the full allowable weight over the front axle.

Furthermore, in all embodiments, it is expected that when the vacuum tank is disposed at the full dumping angle, because the tank is disposed proximate the rear end of the truck rather than longitudinally inward or forward from the rear end of the truck, contents discharged from the vacuum tank substantially clear rear crash protection bumper 46.

Although the hydraulic cylinders referred to in the embodiments described herein are typically attached to the truck at the cylinder base while the rod is attached to the load to be moved, i.e., the vacuum tank (whether directly or indirectly via the telescoping parts of the telescopic subframe), the load can be attached to either end of the hydraulic cylinder as movement of the rod relative to the cylinder base, regardless of the end to which the load is attached, will cause relative movement between the load (i.e., vacuum tank) and the truck. This is most clearly shown by dedicated dump cylinder 204 in FIG. 10, which depicts cylinder base 110 as the part that moves under hydraulic pressure. Despite the arrangement shown in FIGS. 7-10, typically, movement of the hoses that supply hydraulic fluid to the cylinders will typically be avoided by arranging each cylinder so that the cylinder base, which often accepts the hoses, is fixed so that the rod is the component that moves when pressure is applied. The location of the hoses required to supply hydraulic fluid to the cylinders will therefore often be a factor in determining the orientation of the hydraulic cylinders.

In the embodiments described, it is expected that the vacuum system 30 will typically be powered by a transmission-mounted power take-off (PTO) on the truck chassis or a split-shaft PTO or transfercase installed in the main drive line if the horsepower requirements of the vacuum pump exceed the output capacity of the PTO opening on the transmission. It is expected that the vacuum system will be connected to the vacuum tank by means of a series of tubes and hoses to allow the tank to both dump and move longitudinally on the truck chassis. Electrical connections and hydraulic lines for the rear door and clearance lighting on the vacuum tank are expected to be similarly connected, typically utilizing nylon cable carriers to guide the cables and hoses during the transition from the retracted, forward position to the extended positions.

Referring to FIGS. 2, 11 to 14, and 16, a system for varying the weight over one or more axles of a truck carrying a vacuum tank, constructed in accordance with an embodiment, is noted generally by reference numeral 300. System 300 is typically used with trucks having at least two tank feet 52 disposed on each of opposite sides 21, 23 of underside 22 of forward portion 20 of the vacuum tank. As shown in the accompanying drawings, typically each of the two forwardly disposed tank feet is attached to a reinforcing ring 10*a* of tank 10.

System 300 includes one or more elongate hold-down structures 302 fixedly mounted to the frame structure of the truck, and an elongate front tank lug 304. As shown in FIG. 2, each elongate hold-down structure defines retaining slot 303 dimensioned for slidable engagement with a respective elongate front tank lug. Referring to FIGS. 2 and 16, the tank lug is expected to span gap 308 between the two tank feet on a respective side 21, 23 of the underside 22 of the tank. The tank lug will, in most cases, be welded to the tank feet by one or more formed, fabricated or structural angles. In most cases, one formed, fabricated or structural angle iron 310, that spans gap 308, will be used to secure the tank lug to the tank feet. The formed, fabricated or structural lug will be welded to the tank feet on its horizontal member 310*a*, and the tank lug will be welded to and protrude outward from a downwardly disposed vertical member 310*b* of the formed, fabricated or structural angle iron, in a direction away from telescopic subframe 102 over which the formed, fabricated or structural angle iron is disposed, as best shown in FIG. 16. It is expected that the tank lug will be longitudinally disposed on a horizontal plane such that, when the vacuum tank is horizontally at rest on the mounting frame, the tank lug will be longitudinally aligned with slot 303 of a respective elongate hold-down structure.

As best shown in FIG. 16, one or more nylon pads 54 will typically be disposed between horizontal member 310*a* of the one or more formed, fabricated or structural angle irons and fixed part 104 of the telescopic subframe. In most cases, it is expected that the nylon pad will also span gap 308, although separate, smaller nylon pads can be used at least beneath each of the tank feet so that each pad is attached to an opposite end of the formed, fabricated or structural angle iron.

It is expected that when the vacuum tank is slid from an extended position, at which the front tank lugs are clear of the respective elongate hold-down structures, forward toward the front end of the truck, each front tank lug will be slidably engaged by a respective elongate hold-down structure so that the hold-down structures substantially restrict vertical and lateral movement of the vacuum tank.

In most cases, it is expected that the elongate hold-down structures and the respective elongate front tank lugs have substantially the same length, which length is expected to be greater than a first distance from the forward position to the first extended position, and less than a second distance from the forward position to the second extended position. This is necessary so that when the vacuum tank is disposed at the forward position as shown in FIG. 11, or the first extended position as shown in FIG. 12 (i.e., the transport positions), each front tank lug remains slidably engaged by a respective elongate hold-down structure, and when the vacuum tank is disposed at the second extended position or the operating position, each front tank lug is clear of a respective elongate hold-down structure, as shown in FIG. 13 where the tank is horizontally disposed, and in FIG. 14 where the tank is partially lifted. In most cases it is expected that the length will be substantially longer than the first distance so that when the vacuum tank is disposed at the first extended position, each front tank lug will remain slidably engaged by a substantial length of the respective elongate hold-down structure. The substantial overlap, as shown in FIG. 12, is expected to provide the retention strength necessary to safely secure the forward portion of the tank to the truck. It is further expected that when the vacuum tank is disposed at the forward position, each front tank lug will be substantially completely slidably engaged by a respective elongate hold-down structure, as shown in FIG. 11.

In some instances, each elongate hold-down structure comprises spaced apart plate structures 302*a* vertically arranged substantially parallel to each other. For added stability, in many cases the plate structures are fixedly joined to one another by flatbar structure 306 which spans and is fixedly attached to each of the plate structures.

It is expected that both system 100 and system 200 can be used with system 300 in order to laterally and vertically secure the front portion of the vacuum tank when the tank is in the forward or first extended positions. FIG. 2, for example, depicts system 100 having extension/lift hydraulic cylinders 108 and retraction cylinders 132, used in conjunction with system 300.

System 300 is expected to meet relatively newly introduced DOT/TC 407/412 regulations requiring secure retention of the forward portion of vacuum tanks during transport, while affording the operator the ability to adjust the longitudinal position of the tank according to the weight restrictions imposed in a particular jurisdiction, in order to take full advantage of the maximum over-axle weight restrictions, and further allowing the operator to dispose the tank at an operating position free of the elongate hold-down structures to permit the tank to be pivoted for dumping action.

System 300 has been omitted from FIGS. 1 and 3 to 10, and many features have been omitted from FIGS. 11 to 14 and 16, such as the hydraulic cylinders and the vacuum system, for example. This is intended to de-clutter the figures so that the features of systems 100, 200, 300 are more clearly shown.

The controller can operate by way of hardware components, software or any combination of the two, or in any other manner. The controller can have access to a memory. Moreover, some example embodiments of the controller are also directed to a pre-recorded storage device or other similar computer-readable medium including program instructions stored thereon for performing the processes described herein. The computer-readable medium includes any non-transient storage medium, such as RAM, ROM, flash memory, compact discs, USB sticks, DVDs, HD-DVDs, or any other such computer-readable memory devices. In accordance with an example embodiment, there is provided a non-transitory computer-readable medium containing instructions executable by a processor for performing any or all of the operations of the controller. In at least some example embodiments, the controller can be a processor, computing device, etc. The controller can be fully automated, semi-automated, fully manual, semi-manual, or combinations thereof. The controller can include an automatic or manual actuator. For example, in some embodiments, the controller may be manually activated by the actuator, after which automated or semi-automated functions can provide the necessary control mechanisms until the actuator is manually disengaged. In other embodiments, an actuator of the controller can be automatically engaged, for example, in response to GPS positioning information indicating that the vacuum truck has moved from one jurisdiction into another having different over-axle weight restrictions. The actuator can then be automatically or manually disengaged, for example, when the vacuum tank has been re-positioned.

The hydraulic cylinders can be any system using a fluid (gas or liquid) under pressure to move mechanical components. The hydraulic cylinder pumps, which generate the required pressure, can be manually, electrically, hydraulically, pneumatically, or engine-driven, for example. In some embodiments, it may be possible to use entirely manual mechanisms for horizontal movement and/or vertical lifting or lowering of the vacuum tank, such as, for example, by use of hydraulic jacks, such as floor or bottle jacks. Other manual means capable of achieving horizontal movement and/or vertical lifting or lowering of the vacuum tank are with the scope of the present disclosure.

In at least some or all described embodiments, rear tank slide stops 126 may provide lateral and vertical stability to the releasably engaged vacuum tank and telescopic subframe. In particular, once the rear tank hinge pins are releasably nested into the rear tank slide stops (which is when the transitional lift movement has completed in system 100, or when the tank is disposed at the operating position in system 200), it is expected that the rear tank slide stops will substantially laterally and vertically retain the releasably engaged rear tank hinges and the telescopic subframe attached thereto to facilitate stabilization of the vacuum tank and the telescopic subframe, for system 100, when the vacuum tank is lifted after completion of the transitional lift movement, and for system 200, either when the vacuum tank is horizontally disposed or when the tank is being lifted.

At least some or all of the systems 100, 200, 300 described may be modular so that any existing truck with a suitable chassis can be retrofitted with vacuum tank 10, vacuum system 30, and system 100, 200, 300. Where support frame 120 is used, the only components required to be directly attached to the chassis are the support frame, rear crash protection bumper 46 and the power take-off (PTO) device (whether a transmission-mounted PTO or split shaft/transfercase installed in the main drive line). The vacuum tank/vacuum system/system 100, 200, 300 assembly is simply lifted onto the chassis and fixed in place by, for example, welding or U-bolting. It is expected that all other trim, such as side trays and fenders, will be installed onto the support frame or the telescopic subframe.

At least some or all of the embodiments described may be adapted to accommodate trucks equipped with one or more additional rear axles beyond the standard two tandem rear axles. These trucks often include a third or additional rear axle to further increase total load capacity of the truck. The additional axle may be a driving axle in which case the truck will have what is commonly known as a tri-drive chassis, or the additional axle may be a non-driving lift axle that can be lowered when additional weight is required to be carried or dumped.

At least some or all of the systems 100, 200, 300 may be adapted to accommodate over-axle weight restrictions other than those described hereinabove, by providing additional or alternately disposed extended positions, such as by adapting the system to dispose the pin holes and/or pin stops at different longitudinal positions, and/or, for example, including multiple pin holes in the telescoping parts of the telescopic subframe so that the placement of the pins can easily be varied to cause contact between the pin and the pin stop at a more or less forwardly disposed position.

It is to be understood that what has been described are the example embodiments. The scope of the claims should not be limited by the preferred embodiments set forth above, but should be given the broadest interpretation consistent with the description as a whole.

The invention claimed is:

1. A system for varying weight over one or more axles, the system comprising:
   a vacuum truck including a truck having a front axle and one or more rear axles, and a vacuum tank carried by the truck;
   a telescopic subframe comprising one or more elongate structures, each of said one or more elongate structures having a fixed part and a telescoping part telescopically engaged with the fixed part, each of said one or more fixed parts fixedly attached to a mounting frame of the truck so that the telescopic subframe lays substantially horizontally on the mounting frame, and
   one or more hydraulic cylinders operable by a controller, each of said one or more hydraulic cylinders attached to and operably coupling the truck and the vacuum tank,
   wherein the vacuum tank is hingedly attached at a rear portion of the vacuum tank to each of said one or more telescoping parts of the telescopic subframe, the one or more telescoping parts disposed rearward of the respective one or more fixed parts,
   and wherein, in use, the controller is activated to cause an extension stroke of the one or more hydraulic cylinders to cause the vacuum tank to slide rearward away from a front end of the truck.

2. The system of claim 1, wherein, in use, the controller is further activated to cause a retraction stroke of the one or more hydraulic cylinders to cause the vacuum tank to slide forward toward the front end of the truck.

3. The system of claim 1, wherein the vacuum tank is slidable rearward from a forward position whereat the one or more hydraulic cylinders are fully retracted, to one or more extended positions.

4. The system of claim 3, wherein retraction of the vacuum tank from one of said one or more extended positions to another of said one or more extended positions or to the forward position is facilitated by a retraction stroke of one or more retraction cylinders operably coupling the truck and the one or more telescoping parts of the telescopic subframe.

5. The system of claim 4, wherein each of said one or more retraction cylinders is disposed within one of said one or more elongate structures of the telescopic subframe.

6. The system of claim 5, wherein:
   each of said one or more hydraulic cylinders is an extension/lift hydraulic cylinder having a cylinder base and a rod telescopically coupled to the cylinder base, and
   the cylinder base of the one or more extension/lift hydraulic cylinders is hingedly attached to a frame structure of the truck and the rod of each of said one or more extension/lift hydraulic cylinders is hingedly attached to the vacuum tank by respective one or more tank hinges at a location rearward from said one or more cylinder bases.

7. The system of claim 1, wherein the telescopic subframe comprises two of said elongate structures spaced apart on a horizontal plane, each of said two elongate structures disposed underneath the vacuum tank on opposite sides of the vacuum tank.

8. The system of claim 6, wherein each of said one or more telescoping parts protrudes by a certain length from the respective fixed part of the telescopic subframe when the telescopic subframe is fully retracted, to define a protruding segment,
   and wherein the vacuum tank is hingedly attached at the rear portion of the vacuum tank to each of said one or more protruding segments of said respective telescoping parts of the telescopic subframe by respective one or more rear tank hinges.

9. The system of claim 1, wherein a forward portion of the vacuum tank has one or more fixedly attached tank feet disposed on an underside of the vacuum tank, the one or more tank feet resting atop the one or more fixed parts of the telescopic subframe when the vacuum tank is horizontally disposed.

10. The system of claim 8, wherein:
    the one or more extended positions comprise a first extended position and a second extended position,
    the second extended position being an operating position whereat a rear door of the vacuum tank is disposed proximate a rear end of the truck to facilitate loading or unloading of the vacuum tank by an operator from behind the truck, and wherein the forward position and the first extended position are transport positions whereat the vacuum truck can haul the vacuum tank and contents therein over roadways.

11. The system of claim 1, wherein the mounting frame is selected from the group consisting of a chassis of the truck and a support frame, the support frame disposed between the telescopic subframe and the chassis so that each of the one or more fixed parts of the telescopic subframe is fixedly attached to the support frame and the support frame is fixedly attached to the chassis.

12. The system of claim 10, further comprising one or more transitional lift arms hingedly attached to the frame structure of the truck, wherein:
   each of said one or more transitional lift arms has a free end shaped and dimensioned to releasably receive therein a tank hinge pin of one of the respective tank hinges, and is arranged so that the free end is forwardly upwardly biased,
   and wherein, in use, when the one or more extension/lift hydraulic cylinders are activated to cause an extension stroke of the one or more rods to slide the vacuum tank from the forward position rearward, each of the one or more tank hinge pins releasably engages a respective one of the one or more free ends of the transitional lift arms when the vacuum tank is at the operating position.

13. The system of claim 12, wherein each of said transitional lift arms is biased upward by a spring.

14. The system of claim 12, wherein further activation of the one or more extension/lift hydraulic cylinders when the one or more tank hinge pins are releasably engaged by the one or more free ends of the respective one or more transitional lift arms causes a transitional lift movement wherein the vacuum tank pivots upward while the vacuum tank continues to slide longitudinally rearward until one or more rear tank hinge pins of the respective one or more rear tank hinges becomes releasably engaged by one or more rear tank slide stops that prevent further longitudinal rearward movement of the vacuum tank,
   a horizontal force of each of the one or more extension/lift hydraulic cylinders being substantially converted into a vertical lifting force by the engagement with the respective one or more upwardly biased transitional lift arms to facilitate lifting of the vacuum tank.

15. The system of claim 14, wherein further activation of the one or more extension/lift hydraulic cylinders when each of the one or more rear tank hinge pins has engaged the respective one or more rear tank slide stops causes the vacuum tank to pivot about the one or more rear tank slide stops to lift the vacuum tank away from the one or more transitional lift arms, the vacuum tank being disposed at a full dumping angle when the one or more extension/lift hydraulic cylinders are fully extended.

16. The system of claim 15, wherein the one or more rear tank slide stops substantially laterally and vertically retain the releasably engaged rear tank hinges and the telescopic subframe attached to the rear tank hinges to facilitate stabilization of the vacuum tank and the telescopic subframe when the vacuum tank is lifted after completion of the transitional lift movement.

17. The system of claim 15, wherein each of the one or more transitional lift arms remains upwardly biased once separated from the vacuum tank at an engagement position whereat the free end of the transitional lift arm is releasably engaged by the respective tank hinge pin when the retraction stroke is activated causing the vacuum tank to descend onto the transitional lift arm, the releasable engagement with the free end of the transitional lift arm facilitating lowering of the vacuum tank.

18. The system of claim 17, wherein each of said one or more transitional lift arms is prevented from pivoting upward past the engagement position by a lift arm stopper.

19. The system of claim 15, wherein contents discharged from the vacuum tank when the vacuum tank is disposed at the full dumping angle substantially clear a rear crash protection bumper of the truck.

20. The system of claim 10, wherein, during retraction of the vacuum tank from a position at or rearward of the first extended position, the vacuum tank is prevented from moving forward past the first extended position by releasable engagement between a pin and a pin stop,
   the pin releasably inserted into a pin hole in the respective telescoping part of the telescopic subframe, and
   the pin stop disposed on a rearward edge of the respective fixed part of the telescopic subframe and shaped and sized to releasably engage the inserted pin,
   the pin hole positioned so that when the pin inserted therein contacts the pin stop, the telescoping part of the telescopic subframe is prevented from retracting the vacuum tank beyond the first extended position.

21. The system of claim 8, further comprising one or more telescopic subframe guides, each of said one or more guides fixedly attached to one of said one or more rear tank hinges, each said guide comprising one or more elongate plates extending below a bottom edge of the respective telescoping part of the telescopic subframe on one or more sides of the telescoping part to define one or more guide members, each of said one or more guide members disposed adjacent the mounting frame over which the telescopic subframe is mounted to assist in laterally retaining the vacuum tank.

22. A system for varying weight over one or more axles, the system comprising:
   a vacuum truck including a truck having a front axle and one or more rear axles, and a vacuum tank carried by the truck;
   a telescopic subframe comprising one or more elongate structures, each of said one or more elongate structures having a fixed part and a telescoping part telescopically engaged with the fixed part, each of said one or more fixed parts fixedly attached to a mounting frame of the truck so that the telescopic subframe lays substantially horizontally on the mounting frame, and
   one or more extension/retraction hydraulic cylinders operable by a controller, each of said one or more extension/retraction hydraulic cylinders attached to and operably coupling the truck and the vacuum tank,
   wherein the vacuum tank is hingedly attached at a rear portion of the vacuum tank to each of said one or more telescoping parts of the telescopic subframe, the one or more telescoping parts disposed rearward of the respective one or more fixed parts,
   wherein, in use, the controller is activated to cause an extension stroke of the one or more extension/retraction hydraulic cylinders or a retraction stroke of the one or more extension/retraction hydraulic cylinders to cause the vacuum tank to slide rearward from a front end of the truck or forward toward the front end of the truck, respectively.

23. The system of claim 22, wherein:
   the vacuum tank is slidable rearward, from a forward position whereat the extension/retraction hydraulic cylinder is fully retracted, to one or more extended positions, and the vacuum tank is slidable forward from one of the one or more extended positions to the another of the one or more extended positions or to the forward position.

24. The system of claim 22, wherein each of said one or more extension/retraction hydraulic cylinders is disposed within one of said one or more elongate structures of the telescopic subframe.

25. The system of claim 22, wherein each of said one or more telescoping parts protrudes by a certain length from the respective fixed part of the telescopic subframe when the telescopic subframe is fully retracted, to define a protruding segment, and wherein the vacuum tank is hingedly attached at the rear portion of the vacuum tank to each of said one or more protruding segments of said respective telescoping parts of the telescopic subframe by respective one or more rear tank hinges.

26. The system of claim 22, further comprising:
one or more dedicated dump cylinders operable by a second controller,
one or more movable cross members, and
one or more coupling rods,
wherein each of the one or more dedicated dump cylinders is mounted atop a respective one of the movable cross members and hingedly attached to a forward portion of the vacuum tank, and each of the one or more movable cross members is attached to a respective one of the telescoping parts of the telescopic subframe by a respective one of the one or more coupling rods so that activation of the extension stroke causes each of said one or more coupling rods and correspondingly the respective movable cross member and the dedicated dump cylinder thereon to move rearward.

27. The system of claim 26, further comprising:
one or more cross member pushers mounted to the forward portion of the vacuum tank,
wherein each of said one or more coupling rods is attached to the respective movable cross member by a rod pin received within a slotted mounting hole in the movable cross member, the slotted mounting hole dimensioned larger than the rod pin to facilitate longitudinal movement of the rod relative to the movable cross member,
and wherein, in use, activation of the retraction stroke causes each of said one or more telescoping parts of the telescopic subframe and correspondingly the vacuum tank to move forward toward the front end of the truck, each of the cross member pushers and the respective coupling rods arranged so that the cross member pusher contacts the respective movable cross member before the respective rod pin contacts a forward edge of the respective slotted mounting hole, so that during retraction of the telescopic subframe, each of the one or more movable cross members and the respective one or more dedicated dump cylinders thereon are moved forward by the extension/retraction hydraulic cylinder and the cross member pusher.

28. The system of claim 27, wherein the vacuum tank is disposed in an operating position, whereat a rear door of the vacuum tank is disposed proximate a rear end of the truck to facilitate loading or unloading of the vacuum tank by an operator from behind the truck, by activation of the extension stroke to cause the vacuum tank to move rearward until one or more rear tank hinge pins of the respective one or more rear tank hinges becomes releasably engaged by one or more rear tank slide stops that prevent further longitudinal rearward movement of the vacuum tank.

29. The system of claim 28, wherein activation of the one or more dedicated dump cylinders when the vacuum tank is in the operating position causes the vacuum tank to pivot about the one or more rear tank slide stops, the vacuum tank being disposed at a full dumping angle when the one or more dedicated dump cylinders are fully extended.

30. The system of claim 29, wherein contents discharged from the vacuum tank when the vacuum tank is disposed at the full dumping angle substantially clear a rear crash protection bumper of the truck.

31. A system, comprising:
a vacuum truck including a truck and a vacuum tank carried by the truck, the vacuum tank slidably mounted on a telescopic subframe of the vacuum truck, the telescopic subframe comprising two elongate structures spaced apart on a horizontal plane, each elongate structure comprising a fixed part and a telescoping part telescopically engaged with the fixed part, the fixed part fixedly attached to a mounting frame of the truck so that the telescopic subframe lays substantially horizontally on the mounting frame, the forward portion of the vacuum tank having two fixedly attached tank feet disposed on each of opposite sides of an underside of the vacuum tank, the vacuum tank being hingedly attached on opposite sides of a rear portion of the vacuum tank to each of said telescoping parts of the telescopic subframe so that when the telescoping parts moves rearward towards a rear end of the truck, the vacuum tank correspondingly moves rearward, and when the telescoping parts moves forward towards a front end of the truck, the vacuum tank correspondingly moves forward;
one or more elongate hold-down structures fixedly mounted to a frame structure of the truck, and
an elongate front tank lug fixedly attached to each of said two tank feet disposed on a respective one of said opposite sides of said underside of the forward portion of the vacuum tank, so that each of said elongate front tank lugs spans a gap between each of said two tank feet,
wherein each of said elongate hold-down structures defines a retaining slot dimensioned for slidable engagement with each of said elongate front tank lugs,
and wherein, in use, when the vacuum tank is slid from an extended position whereat each of said elongate front tank lugs is clear of each of said respective elongate hold-down structures, forward toward the front end of the truck, each of said elongate front tank lugs is slidably engaged by each of said respective elongate hold-down structures so that the elongate hold-down structures substantially restrict vertical and lateral movement of the vacuum tank.

32. The system of claim 31, wherein each of the elongate hold-down structures and the respective elongate front tank lugs have substantially the same length.

33. The system of claim 32, wherein the length is greater than a first distance from a forward position to a first extended position, and the length is less than a second distance from the forward position to a second extended position, so that when the vacuum tank is disposed at the forward position or the first extended position, each of said elongate front tank lugs is slidably engaged by a substantial length of each of said respective elongate hold-down structures, and when the vacuum tank is disposed at the second extended position, each of said elongate front tank lugs is clear of each of said respective elongate hold-down structures,
the forward position being the position of the vacuum tank whereat the vacuum tank is fully retracted so that each of said elongate front tank lugs is substantially completely slidably engaged by each of said respective elongate hold-down structures, the forward position and the first extended position being transport positions whereat the vacuum truck can haul the vacuum tank and contents therein over roadways, and the second extended position being an operating position whereat a rear door of the vacuum tank is disposed proximate a rear end of the truck to facilitate loading or unloading of the vacuum tank by an operator from behind the truck, and whereat the vacuum tank can be pivoted for dumping.

34. The system of claim 31, wherein each of said elongate hold-down structures comprises spaced apart plate structures vertically arranged substantially parallel to each other, the plate structures fixedly joined to one another by a flatbar structure spanning the plate structures and fixedly attached to each of said plate structures.

* * * * *